US012612323B1

(12) United States Patent
Williams

(10) Patent No.: US 12,612,323 B1
(45) Date of Patent: Apr. 28, 2026

(54) PROCESS FOR DISSOCIATING, CHELATING, AND DISSOLVING SOLIDS, SUSPENDED SOLIDS, AND BACTERIA, HARVESTING AND LIBERATING OXYGEN BOUND TO OTHER SUBSTANCES, AND PREVENTING DISSOLVED SOLIDS FROM PRECIPITATING AND REPRECIPITATING IN OIL SEPARATION SYSTEMS

(71) Applicant: EnviroKlean, Inc., Midland, TX (US)

(72) Inventor: John Hayden Williams, Frisco, TX (US)

(73) Assignee: EnviroKlean, Inc., Midland, TX (US)

( * ) Notice: Subject to any disclaimer, the term of this patent is extended or adjusted under 35 U.S.C. 154(b) by 0 days.

(21) Appl. No.: 19/094,770

(22) Filed: Mar. 28, 2025

(51) Int. Cl.
| | |
|---|---|
| *C02F 9/00* | (2023.01) |
| *B01D 17/02* | (2006.01) |
| *C02F 1/40* | (2023.01) |
| *C02F 1/66* | (2023.01) |
| *C02F 1/00* | (2023.01) |
| *C02F 1/34* | (2023.01) |
| *C02F 1/72* | (2023.01) |
| *C02F 101/20* | (2006.01) |
| *C02F 101/32* | (2006.01) |
| *C02F 103/10* | (2006.01) |

(52) U.S. Cl.
CPC ........... *C02F 9/00* (2013.01); *B01D 17/0214* (2013.01); *C02F 1/40* (2013.01); *C02F 1/66* (2013.01); *C02F 1/004* (2013.01); *C02F 1/34* (2013.01); *C02F 1/72* (2013.01); *C02F 2101/203* (2013.01); *C02F 2101/32* (2013.01); *C02F 2103/10* (2013.01); *C02F 2301/026* (2013.01); *C02F 2301/046* (2013.01); *C02F 2303/22* (2013.01)

(58) Field of Classification Search
None
See application file for complete search history.

(56) References Cited

U.S. PATENT DOCUMENTS

| | | | | |
|---|---|---|---|---|
| 5,439,592 A * | 8/1995 | Bellos | ..................... | C02F 1/441 |
| | | | | 210/639 |
| 7,681,643 B2 * | 3/2010 | Heins | ..................... | E21B 43/40 |
| | | | | 159/901 |
| 2012/0255904 A1 * | 10/2012 | Nagghappan | ........... | E21B 43/34 |
| | | | | 210/638 |

FOREIGN PATENT DOCUMENTS

WO WO-2013101254 A1 * 7/2013 ........... E21B 21/062

* cited by examiner

*Primary Examiner* — Clare M Perrin
(74) *Attorney, Agent, or Firm* — Gunn, Lee & Cave, P.C.; Nick Guinn

(57) ABSTRACT

A process for separating solids and oil from water without requiring waste haul-off comprising six phases. In the first phase, a stream of raw saltwater is treated with desired chemistry and a beneficial reuse chemical effluent. In the second phase and third phase, the water undergoes oil separation, and the water is stored to facilitate phase changes. In the fourth phase, the saltwater is treated with desired chemistries and a beneficial reuse chemical effluent. In the fifth phase, the water is stored and agitated. In the sixth phase, the water passes through a mechanical filter—or similar unit—the stream then directed to a chemical reactor. Desired chemistries and solids removed from the filter are added to the reactor. The reactor outputs a beneficial reuse chemical effluent which can be recycled to Phase 1 and Phase 4—and prefilter Phase 6—of the system.

15 Claims, 15 Drawing Sheets

PROCESS FOR DISSOCIATING, CHELATING, AND DISSOLVING SOLIDS, SUSPENDED SOLIDS, AND BACTERIA, HARVESTING AND LIBERATING OXYGEN BOUND TO OTHER SUBSTANCES, AND PREVENTING DISSOLVED SOLIDS FROM PRECIPITATING AND REPRECIPITATING IN OIL SEPARATION SYSTEMS

CROSS REFERENCES TO RELATED APPLICATION

Not applicable.

FEDERALLY SPONSORED RESEARCH OR DEVELOPMENT

Not applicable.

BACKGROUND OF THE INVENTION

1. Field of the Invention

This invention relates to oil and gas separation, namely, treatment of saltwater involved in the oil field. When crude oil is extracted from the ground, it often contains water, sediments, and other impurities. The tank provides a controlled environment where these components can separate based on their density differences. This invention improves the quality of water used in these systems.

2. Description of the Related Art

There is an environmental sustainability need to avoid using fresh (non-salt) water for drilling and hydraulic fracturing and instead use a treated saltwater that comes from sources within the oil and gas industry such as flowback, produced, pipeline and disposal saltwater. To recycle this water for drilling and completions which are the two segments that use the largest volumes of fresh water as an integral part of their individual process to make a well to harvest Oil and Natural Gas from formations, requires that the treated saltwater have certain criteria. These and other processes will use a myriad type of chemistries such as gels, friction reducers (FR), polymers, surfactants, scale inhibitors, breakers, antifoam, demulsifiers and other chemistries to make and produce a well. These chemistries must be compatible when used in conjunction and applied in recycled treated saltwater that are used in these processes.

Limitations on the use of raw pipeline, disposal and produced waters for drilling and completions arise from the contaminations that exist within saltwater other than the additional salinity. There are safety considerations that also act as a deterrent for deadly gasses such as hydrogen sulfide (H2S) and other known contaminates such as total petroleum hydrocarbons (TPH: oil that hasn't been removed in the production processes), sulfides such as iron sulfide (FeS), ferrous iron as Fe2O3 and ferric iron (Fe3O4) to name a few. The industry has adopted complex processes that use technologies and application processes from other industries to help remove these unwanted constituents from the saltwater.

The producers and third-party operators use solids separation processes consisting of chemical and mechanical systems that deploy techniques such as DAF dissolved air flotation, IGF induce gas air flotation, media filtration, filter presses, hydro-cyclones, centrifuges, and other types of mechanical equipment. These processes, as used in other industries, require high flow rates and volumes of water to be processed daily to offset the cost of the equipment and the labor used to operate these processes. They are very costly for the process to have nonproductive time (NPT) and or reduced volumes of saltwater to process.

They also operate best when running at a steady state and don't constantly ramp up and or ramp down with the constantly changing influent flow rates and changing pipeline pressures. The produced saltwater in the production process post drilling and completion process is never at a steady state and has its flow fluctuations due to the combination of many hundreds to thousands of wells all batching and pulsating production fluid volumes in a manner that is inconsistent. It is for this reason that the oil and gas industry has followed how the other industries operated in a manner from where these mechanical and chemical processes have come from.

The Oil and Gas Industry has incorporated processes that store expanded volumes of RAW pipeline and infield water in large above ground storage tanks AST's and produced water storage pits PWSP to house and build inventory. It is from these stored volumes of water that the reuse systems can pull a more controlled and steady process rate. These front-end storage systems all serve a purpose to maintain enough water volume from influent processes that are extremely dynamic and very inconsistent in flow rates. It is within these systems that the large storage volumes of RAW pipeline water act as an equalization area that have a very high levels of total suspended solids (TSS), total dissolved solids (TDS), total petroleum hydrocarbons (TPH), and the organics, which are a combination of bacteria and remnants of chemical treatment(s) used in the upstream process from where this influent water came from.

Although these storage systems fulfill their primary task of holding a significant volume of water, they will over time create an environment where the effluent water coming out of storage has a completely different make up than the influent water. This effluent water will have increased inorganic and organic loadings that will cause the total petroleum hydrocarbons TPH (oil) to become more saturated with basic sediment and water (BS&W), hydrogen sulfide ($H_2S$) and iron sulfide-FeS, scale, paraffins, sludges that influence the uptake of bacteria.

This causes the water to sour and become septic, having the absence of free oxygen. The amount of total suspended solids will increase. Even when operators apply oxidation to the influent process to try and start the first phase of a multi-step process. This oxidation process is meant to reduce the uptake of bacteria and take the dissolved iron oxide as ferrous ($Fe_2O_3$) to a suspended solid as iron oxide as ferric ($Fe_3O_4$). These suspended solids will continue to precipitate and/or become more oil wet with hydrocarbons that are present in these front-end storage systems.

Over time, suspended solids conglomerate in a manner to help form and expand oil saltwater interface. This interface forms a significant rag layer with active bacteria that also contributes to precipitation of dissolved solids, that impacts the buildup on the bottoms of the storage areas. These areas of the rag layer and solids that form in the bottoms of these storage systems provide an environment for the bacteria to thrive where they exponentially increase.

The production of elemental sulfur and carbonate-based scales from the active bacteria also increases the inorganic loadings. These additional solids will only further increase the demand for chemical usage and a reduction in processing rates.

These processes are not meant to have dynamic flow rates and constantly changing chemical and mechanical demands. These front-end storage systems produce additional solids, such as suspended iron oxide ferric iron ($Fe_3O_4$), that have to be removed from the water before storage. Then the solids are hauled off for disposal and the extremely fouled oil forms a floating sludge that must be mechanically removed so it can be sent to land fill. These oil wet solids cost more to dispose of due to the oil content as opposed to the solids that are not oil wet. There are additional processes that clean the oil to recover some revenue from the fouled oil and offset the disposal cost.

The traditional reuse systems that pull raw untreated produced waters off pipelines and existing infrastructure use the following methods to condition water and remove solids as illustrated in FIG. 1.

FIG. 1 illustrates a traditional reuse system that pulls raw untreated produced waters off pipelines and existing infrastructure to condition water and remove solids. The traditional system begins with an influent of pipeline water 900, which contains solids (e.g., iron sulfide). Sometimes, the influent of pipeline water is directed to an oil separator 902. The oil separator is optional and not too common because oil separators are very large and field erected. As a result, they are not easily transported. When an oil separator is not deployed, the oil combines with floating solids, making an extremely oil-wet solid on top of the stored saltwater in the produced water storage-AST and or the produced water pit storage (PWP) (described below). Waste solids are expensive to haul off and most systems must be taken offline to perform a cleaning process. When an oil separator 902 is employed, two streams are directed out of the oil separator: a water stream and an oil stream.

The oil stream is directed to an oil recovery storage tank 904 for storing collected skim oil. The collected skim oil can be directed to one or more destinations. It can be trucked off. It can be transported to an oil recovery cleaning process facility 906 to remove the basic sediment and water (BS&W) and then transported to the oil recovery sales terminal 908, with the solids going to a solid waste (landfill) facility 910 that accepts oilfield waste. The oil can be transported directly to the oil recovery sales terminal 908 and not be processed at the oil recovery cleaning process facility 906.

The pipeline influent saltwater 900—either post-oil separator 902 or immediately from the beginning of the process, if no oil separator is present—will then enter the produced saltwater storage tank 912. Frequently, the operator will inject the influent saltwater 900 with oxidation chemistry that will cause iron oxide ($Fe_3O_4$), iron carbonate ($Fe_2CO_3$) and or calcium bicarbonate ($CaCO_3$) to form and break out other total dissolved solids TDS as a form of total suspended solids TSS 914, such as hydrogen peroxide ($H_2O_2$) or any number of other oxidants, before the saltwater 900 enters the produced saltwater storage tank 912. These oxidants react mainly with the total iron-Fe and move all dissolved ferrous iron ($Fe_2O_3$) to the suspended solids state as ferric iron ($Fe_3O_4$), iron carbonate ($Fe_2CO_3$), iron sulfide (FeS) and or calcium carbonate ($CaCO_3$), where it is ready to be conglomerated and then flocked 916 in a polymer process where it will float so that it can be skimmed off in a solid's separation process 918 using, by way of example, a dissolved air floatation-DAF and/or an induced gas air floatation-IGF process.

The effluent of the produced saltwater storage will then move to the inlet of the solids separation process 918. As stated above, between units 902, 912 a chemical package is injected 914 that can consist of several chemistries to adjust pH, conglomerate ferric iron ($Fe_3O_4$) and other unwanted properties. Adding a flocculant will pull the pin floc and form a floc that will float with the use of micro air bubbles to lift the solids so they can be skimmed off with a minimal amount of saltwater. There are two effluent streams that these solids separation process 918 produce: a wet sludge that will go to a sludge waste collection tank 920, and a stream of clarified water that can go through an optional filter system 922. Alternatively, the stream of clarified water can go directly to the effluent storage 924. Most of the saltwater will end up in the effluent storage location 924.

The waste material, such as filter cartridges, filter socks, wet sludge, and/or back washing solids are directed to a solid waste (landfill) facility 910 that accepts oilfield waste. This becomes expensive and wasteful.

The wet sludge from the solid's separation process (DAF-IGF) can be decanted and dewatered using waste treatment equipment, such as a filter press and/or a centrifuge 926 to reduce the weight and the volume of solids to be hauled off for solid waste disposal 910. The saltwater from this process 928 is usually added back into the treatment process somewhere after oil separation and bulk influent storage is located, such as the produced water storage 912.

The need to reuse saltwater has become greater than ever and no process currently exists that doesn't generate solids that require them to be disposed directly or after they have become dewatered and or that can harvest the oxygen ($O^-$) and hydrogen ($H^+$) ions that are bound to other compounds in the water while dissolving the suspended solids and organics back into solution. And none of the existing processes having a beneficial reuse chemical effluent that has a low pH from the harvested hydrogen ions ($H^+$) and an oxidation reduction potential of $>+300$ mV (ORP), which can consist of cycled up oxygen ($O^-$) from compounds and bonds that were broken that was tying up the oxygen.

SUMMARY OF THE INVENTION

The present invention was developed to address the problems discussed above. The treatment of saltwater to condition it for reuse must address some basic contaminants that are common to produced water flowing through pipelines and processing facilities. These contaminants will facilitate the formation of solids and/or are already in the form of total suspended solids (TSS) and not as a total dissolved solid (TDS).

There is a sequential phase to prevent additional solids from forming and conglomerating, while also taking the existing suspended solids that exist in the form as a total suspended solid (TSS) and converting them back into a total dissolved solid (TDS), which is where most of these solids originate.

The produced saltwater has a non-water soluble contaminate, which remains present even after passing through several phases of upstream separation which is in the form of a total petroleum hydrocarbon (TPH), also referred to as total oil and gas (TOG). These hydrocarbons will vary greatly in volume and densities that will contribute to the formation of basic sediment in water.

These hydrocarbons have a charge mechanism that will bond with iron (Fe), iron oxide ($Fe_3O_4$), iron hydroxide (FeOH), iron sulfide (FeS), iron carbonate ($FeCO_3$), calcium carbonate ($CaCO_3$), paraffins, and organics, including biologicals. These oil wet solids create a sludge, which allows solids that would normally precipitate to float instead and have oxygen and hydrogen ions attached to and within their respective compounds that are not free. The solids and hydrocarbons, which are of a lighter density than that of saltwater when combined with various forms of iron and iron compounds, float. An interface forms in the sludge and provides surface area that supports the uptake of anerobic bacteria. This anerobic bacteria reduces sulfate ($SO_4^{2-}$) and forms hydrogen sulfide ($H_2S$) as a gas as a waste byproduct as they consume the oxygen that is attached to the sulfur ion that forms the sulfate compound. This deadly sulfide gas contributes to souring the saltwater even further. When this produced saltwater is stored on the front end of any treatment system and as the volume of that water increases, the inorganic demand of the water starts to exponentially increase. This biochemical oxygen demand (BOD) not only helps form additional solids, but it also directly impacts the chemical oxygen demand needed to treat these types of processes. This type or form of solids loading is very common in waste treatment facilities used in other industries. Pretreatment of these produced waters before storage (regardless of volume) is needed to prevent: 1) additional oil wetting of solids, and 2) the souring of fluids by anaerobic bacteria (SRB) that reduce sulfates and generate hydrogen sulfide as a waste byproduct in above-ground storage tanks or produced water pits while awaiting processing. As illustrated in FIG. 7, sulfate-reducing bacteria using a dissimilatory sulfate reduction pathway to convert sulfate to sulfide through a series of enzymatic reactions.

The present invention involves a process for separating solids and oil from water without requiring waste haul-off comprising six phases. In the first phase, a stream of raw saltwater is treated with desired chemistry and a beneficial reuse chemical effluent that leverages the hydrogen ($H^+$) ions from strong acid such as hydrogen chloride (HCl), acetic acid ($CH_3COOH$), phosphoric acid ($H_3PO_4$) that has a bonded carbon array or chelating agent such as carbon arrays or EDTA (ethylenediaminetetraacetic acid), deferoxamine, deferasirox, and deferiprone to prevent the hydrogen from potentiating and forming the hydronium ion ($H_3O$) and thereby sequestering the hydrogen until a desire charge reaction with other ions in the water is present such as iron sulfide (FeS), iron carbonate ($FeCO_3$) and calcium carbonate ($CaCO_3$), bicarbonate ($HCO_3$), along with an oxidizer such as hydrogen peroxide ($H_2O_2$), sodium hypochlorite (NaOCl), sodium chlorite ($NaClO_2$) to prevent the formation of chlorine dioxide ($ClO_2$) halogen compounds allowing for the formation of a salt (NaCl) and freeing the oxidizers oxygen ($O_2$) and electrons ($3^e$) to oxidize iron (Fe) compounds and allow for redox process to occur. In the second phase and third phase, the water undergoes oil separation, and the water is stored to optimize retention time that facilitates phase changes. In the fourth phase, the saltwater is treated with desired chemistries such as carbon arrays or EDTA (ethylenediaminetetraacetic acid), deferoxamine, deferasirox, and deferiprone to specifically harvest hydrogen ions ($H^+$) and oxygen ions ($O^-$) that are bound to iron (Fe) compounds and a beneficial reuse chemical effluent having the additional previously harvested hydrogen ions ($H^+$) and oxygen ions ($O^-$) that have increased their cycles of concentration cycle up. In the fifth phase, the water is stored and agitated. In the sixth phase, the water passes through a mechanical filter—or similar unit—the stream is then directed to a chemical reactor for the purpose of taking the total suspended solids (TSS) particles that can consist of organic and inorganic material. These suspended solids will be broken into dissolved solid particles that are now in solution attached to the water molecules. During this reactor process, the chelation of certain metals (Cations) with a charge>1.2, such as iron-Fe, lead and radioactive isotopes occurs. Desired chemistries and solids removed from the filter are added to the reactor. The reactor outputs a beneficial reuse chemical effluent that has a low pH from the harvested hydrogen ions ($H^+$) and has an oxidation-reduction potential of >+300 mV (ORP) which can consist of cycled-up oxygen ($O^-$) and oxidants from the treatments applied upstream. which can be recycled to Phase 1 and Phase 4—and prefilter Phase 6—of the system.

BRIEF DESCRIPTION OF THE SEVERAL VIEWS OF THE DRAWINGS

For an improved understanding of the present invention, and the advantages thereof, reference is made to the following descriptions taken in conjunction with the accompanying figures:

FIG. 3A is an isolated view of part of the embodiment illustrated in FIG. 3.

FIG. 4A is an isolated view of part of the embodiment illustrated in FIG. 4.

DETAILED DESCRIPTION OF THE INVENTION

The present invention provides an assembly and process for separating solids and oil from water and harvesting the bound oxygen and hydrogen ions, while chelating the iron with a carbon array that protects the hydrocarbons from oxidation and also prevents the formation of carbonate scales that also attract hydrocarbons without requiring waste haul-off.

Figure 1:
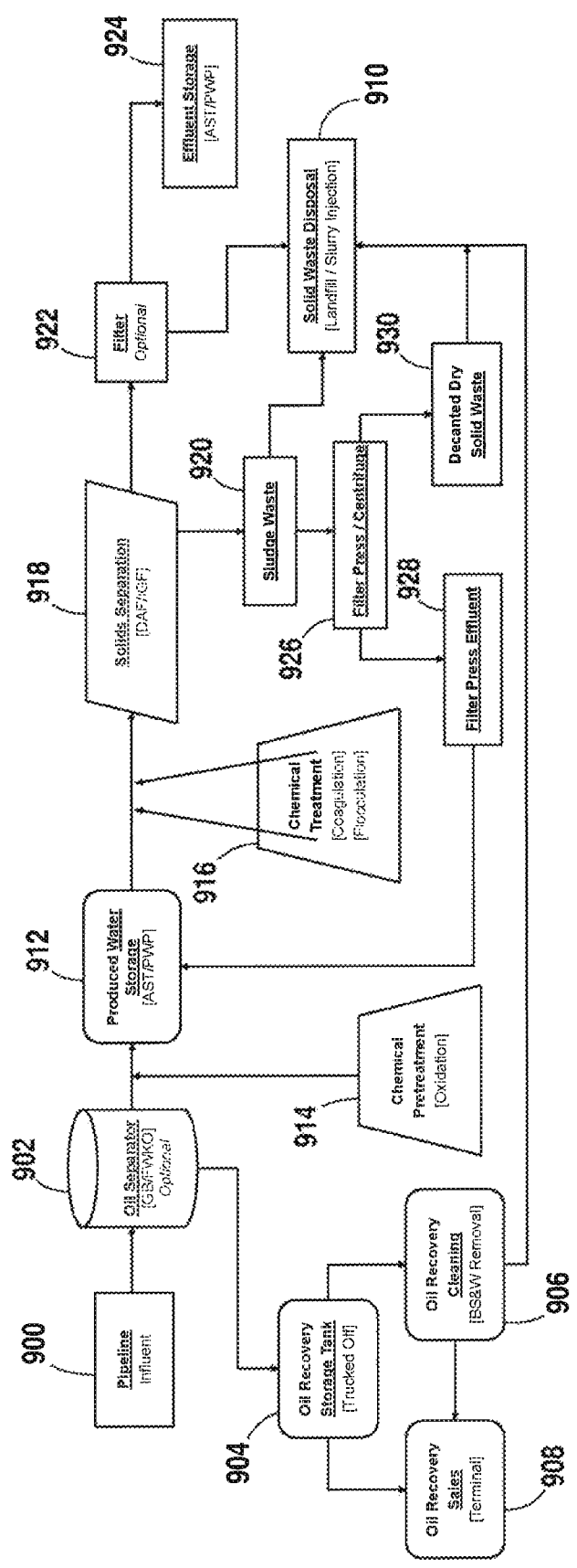
FIG. 1 is a flow diagram showing a traditional reuse system that pulls raw untreated produced waters off pipelines and existing infrastructure to condition water and remove solids.
Figure 1:
Figure 2:
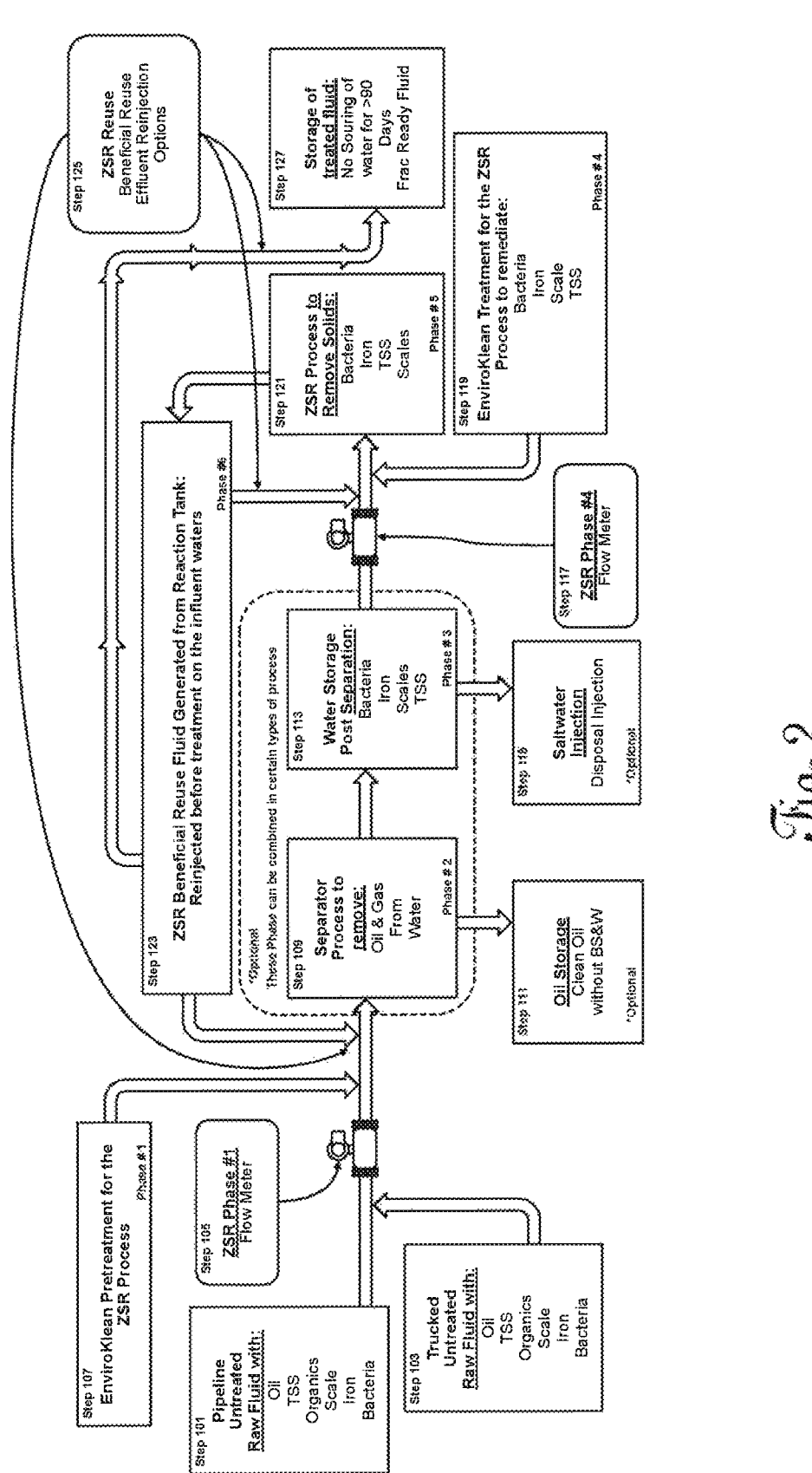
FIG. 2 is a flow diagram of one embodiment of the invention.

FIG. 2 illustrates the primary steps of a water treatment process. This process dissociates and prevents the formation of carbonate scales; chelates iron and NORM (Normally Occurring Radioactive Material) such as uranium, thorium, radium and radon; allows for the chelation of cation charges that are >1.2e; and dissolves solids such as carbonates and iron oxides ($Fe_3O_4$), iron sulfides (FeS), suspended solids such as iron carbonate ($FeCO_3$) and calcium carbonates ($CaCO_3$), and bacteria. The process also prevents dissolved solids from precipitating by chelating divalent and trivalent cations, or reprecipitating by preventing the bicarbonate ($HCO_3$) and T-Alkalinity as ($CaCO_3$) from allowing the pH to increase. Additionally, it harvests oxygen and hydrogen ions that were bound to iron oxide in the process, thereby eliminating the need for solids and/or liquid waste haul off. This process involves six distinct phases. Phase 1 consists of pretreating raw pipeline fluid with desired chemistry.

Phase 2 (optional) involves separating and removing oil and gas from water while preventing the formation of contaminants such as iron-Fe oxide ($Fe_3O_4$) and carbonate scales like calcium carbonate ($CaCO_3$) or iron-Fe carbonate ($Fe_2CO_3$). This phase also oxidizes the fluid, using carbon arrays and other chelation chemistries to protect the TPH/TOG hydrocarbons. Traditionally, these compounds attach to hydrocarbons (oil) and negatively impact the TPH/TOG hydrocarbons, increasing the percentage of BS&W (basic sediments and water). Higher solids and water content in oil reduces its value and increases the cost to clean it back to transmission specifications.

Figure 5:
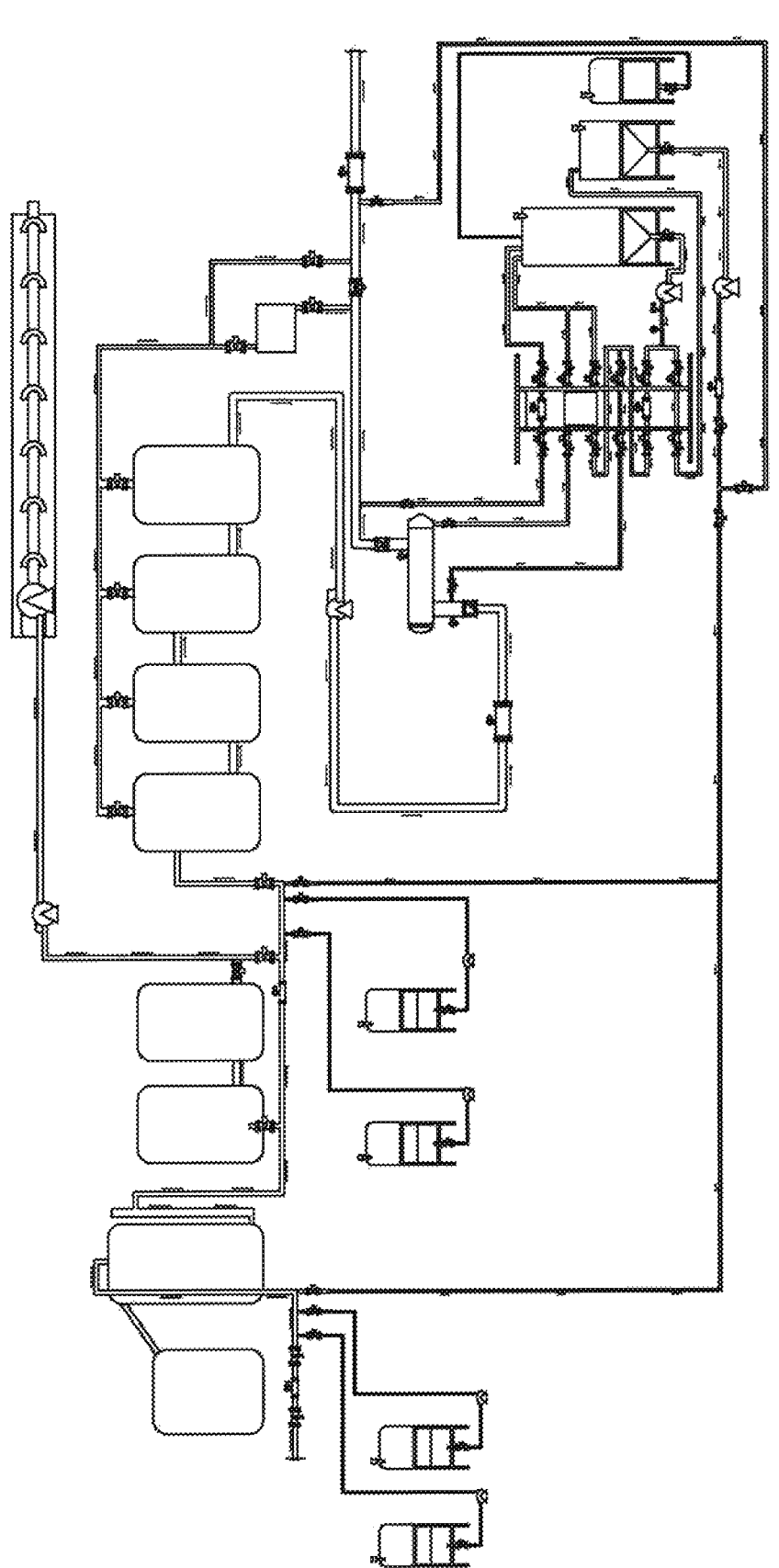
FIG. 5 is a flow diagram of one embodiment of the invention.

Phase 3 (optional) concerns storing water after oil and gas separation. Phase 4 involves treating the stream of pipeline fluid (without oil and gas if Phase 2 was performed) with desired chemistry to remediate additional bacteria, iron, scale, and TSS. FIG. 5 focuses on removing solids using AST, water storage tanks, or other known techniques.

Phase 6 entails filtering the chemically treated saltwater to remove fine particles remaining from previous phases and those already present in the influent water. In this phase, additional desired chemistry is introduced in a chemical reactor to chelate divalent and trivalent cations, disassociate carbonate-based suspended solids, lyse remaining bacteria, and break any remaining hydrocarbons attached to suspended particles. This generates a beneficial reuse fluid with a suppressed pH and an oxidation reduction value of >+300 mV (ORP), where oxygen and oxidant are cycled up.

The beneficial reuse fluid generated in Phase 6 has harvested the suppressed pH from hydrogen ions ($H^+$) and maintains an oxidation reduction potential (ORP)>+300 mV consisting of oxygen (O) and oxidant, plus additional chelating carbon arrays or other chelation chemistries. This fluid can be introduced to the water stream at one or more different phases in this process. It can also be returned to the pit or storage, and used directly in any fluid for fracking.

As stated above, FIG. 2 comprises multiple steps. During Step 101, raw untreated pipeline and infield saltwater are delivered to an existing location such as a saltwater disposal facility ("SWD"), a central tank battery ("CTB"), a production facility, and/or a new temporary location to be processed, stored and then reused during the drilling and/or completions process. This type of saltwater contains known contaminants that are divided into three major groups (inorganic, organic and biological) that need to be removed to make a stable fluid that will not sour within 90 days. Those contaminants include hydrocarbons (oil), organics, bacteria, TSS, scales, NORM and iron.

More specifically, raw untreated pipeline saltwater and infield production saltwater are delivered to the location usually through some form of subsurface and surface pipeline system. However, raw untreated pipeline saltwater and infield production saltwater can be delivered in the present invention by way of delivery in batches by tanker trucks Step 103. It contains the same contaminants described above (e.g., hydrocarbons (oil), organics, bacteria, TSS, scales, NORM and iron). This fluid is traditionally untreated and stored in above ground storage tanks AST, frac tanks FT and or receiving pits as in Step 113.

When Step 103 is performed in this embodiment, the raw trucked saltwater is introduced through an inlet manifold to be comingled with the raw pipeline saltwater. The raw saltwater flows through the system and passes through an inline flow meter in Step 105. The volume and velocity of the influent must be known to prevent system and process chemical upsets from not treating all the fluid in real time (by having the chemical pumps treat based on a ppm rate and volume to maintain accurate ppm targeted treatment levels). As discussed below, using flowmeters improves the optimization of the present invention and eliminates the need to aggressively overtreat with all chemistries. The same is true with respect to monitoring the contents of the fluid at different phases of the invention. The present invention is also automated in some embodiments.

During Step 105, the flow meter measures the volume and velocity of the incoming raw saltwater to be treated. By knowing the volume and velocity, the operator can introduce a designed chemical pretreatment protocol consisting of desired chemistries into a manifold pipe system in Step 107. The desired chemistries are added during Step 107 and prior to hydrocarbon separation Step 109 (optional). As discussed below, the saltwater receives a reinjection of a beneficial reuse fluid in Step 125. The beneficial reuse fluid has beneficial properties to help clean the raw influent saltwater before it enters the separation process due it having a suppressed pH<0.99 from high concentration of hydrogen ($H^+$) ions and an oxidation-reduction potential (ORP) of >+300.00 mV consisting of oxygen ($O^-$) ions, oxidants and carbon arrays and or other chelation chemistries available for additional chelation when reintroduced into another part of the process in Step 109.

During Step 107, the raw water is pretreated with desired chemistries, which help separate the total petroleum hydrocarbons ("TPH") from the water, prevent and break emulsions, and leverage carbon arrays in the water protecting and shielding the hydrocarbons from the water and its contaminants, the buildup of basic sediment and water ("BS&W") within the oil that needs to be removed, by moving the iron (Fe) ions, carbonate based scales and NORM from the hydrocarbons to the water. There is an option to add a beneficial reuse chemical enhanced effluent ("BRUCE$^2$") that contains a suppressed pH<0.99 from high concentration of hydrogen ($H^+$) ions and an oxidation reduction potential (ORP) of >+300.00 mV consisting oxygen ($O^-$) ions, oxidants and carbon arrays and or other chelation chemistries available from Step 123 of this process where the characteristics of the fluid would act as a catalyst and supplement for some of the chemical technologies being applied within Step 107.

Optional Step 109 involves using separation equipment such as gun barrel(s) ("GB"), free water knockouts ("FWK") and/or other types of mechanical process that aid in the separation of saltwater and hydrocarbons (oil). The accumulated hydrocarbons must be removed at some point, or the volumes will increase over time.

Optional Step 111 involves storing the accumulated hydrocarbons separated in Step 109 in oil storage tanks ("OT") until the oil is transported off location. Larger above-ground storage tanks ("AST") may prove ideal for this step as there will often be enough space in AST where the accumulated hydrocarbons (i.e., oil) can be stored until transported off location.

Optional Step 113 involves storing the saltwater post hydrocarbon (oil) separation process in Step 109. The saltwater accumulates and is available for processing suspended solids. Some of the stored water in Step 113 can be diverted to the saltwater disposal ("SWD") injection process in Step 115, which is optional. This optional step can be run at any time, at any volume regardless of flow rate (or velocity). Step 115 is not dependent on any further downstream treatment processes, which may be in operation.

The ability to divert saltwater from Step 113 to a saltwater disposal injection process Step 115 allows for the diversification and parallel processes to use the volume of the influent saltwater in Step 101. This option is not interdependent on the rest of the process in the present invention.

While Steps 109, 113 are optional, they can also be combined in some embodiments.

After the saltwater exits water storage in Step 113 (or receives chemical pretreatment and/or treatment of beneficial reuse fluid, when Steps 109, 113 do not occur) the saltwater passes through a flow meter in Step 117. The flow meter measures the volume and velocity of the incoming saltwater to be treated from the storage in Step 113. The quantity of saltwater passing through the flow meter will impact the amount of designed chemical pretreatment protocol added to the saltwater in Step 119.

In Step 119, the saltwater is treated with desired chemistries in a manifold pipe system before it enters Step 121 where the suspended solids and organics are chemically pretreated for conglomeration and dissociation in Step 123. During Step 119 chemistries are injected into a manifold pipe system. The designed chemical treatment will mix within the water that has the suspended solids and organics. The suspended solids and organics receive their respective chemical treatments, and they are distributed for adhesion of the chelating chemistries. The dissociation of solids prior to the chelation of divalent and trivalent cations prevents the formation of bicarbonate that forms bicarbonate scales. There is an option to add a beneficial reuse chemical enhanced effluent ("BRUCE$^{2}$") effluent from Step 123 of this process where the characteristics of the fluid that contains a suppressed pH<0.99 from high concentration of hydrogen (H$^+$) ions and an oxidation reduction potential (ORP) of >+300.00 mV consisting of oxygen (O$^-$) ions, oxidants and carbon arrays and or other chelation chemistries available would act as a catalyst and supplement for some of the chemical technologies being applied within Step 119.

After chemical treatment in Step 119, the saltwater undergoes the mechanical process of removing any remaining suspended solids in Step 121. During Step 121, the saltwater has some designed residence time—which may occur in a plurality of water storage tanks, an AST, or the like—following the addition of chemical treatments in Step 119. Step 121 also allows for state changes within the water, which still contains some suspended solids and organics. During this step, the distribution and adhesion of chemical treatments for chelation of cations with a charge>1.2$^e$ oxidation and redox for any sulfides and organics occurred based on the chemistries, which are designed for the desired key performance indicators ("KPI") for the stored post-treated saltwater such as iron (Fe), pH, Alkalinity, Oxidation Reduction Potential (ORP), Bacteria Counts (cATP) and others in Step 127.

After the saltwater completes Step 121, the saltwater passes through a mechanical process, such a filter, centrifuge, dissolved air flotation-DAF, induced gas flotation-IGF, hydro cyclone, clarifier and other types of processes that aid in collecting these particles. The fine suspended solids and organic particles that have remained in the saltwater through Step 121, are then stored within a reaction tank in Step 123. A chemical that contains a suppressed pH<0.99 from high concentration of hydrogen (H$^+$) ions and carbon arrays and or other chelation chemistries treatment is added to this reaction tank, which will take all suspended solids and organics and regenerate through dissociation and chelation them into a dissolved solid state, becoming a part of the total dissolved solids that exist within the saltwater. It is during this Step 123 that the chemically treated fluid—through the conglomeration and dissociation of particles, that contains a suppressed pH<0.99 from high concentration of hydrogen (H$^+$) ions and an oxidation reduction potential (ORP) of >+300.00 mV consisting of oxygen (O$^-$) ions, oxidants and carbon arrays and or other chelation chemistries available— that a beneficial reuse fluid is formed. It is in this reaction tank that the fluid is constantly moving through a recirculation pump that pulls the water from the cone bottom of the tank and then pushes the water back on top of itself and angled against the wall of the tank so that the flow of recirculating water creates a vortex. This vortex will pull any gasses released or foaming from proteins being broken and or surfactant back into the water for further processing. This reaction tank will have a cone bottom where the suction for the pump is located and prevents low flow areas from having surfaces where precipitated solids could accumulate that would build up over time and create an unwanted upset within the system. The vortex is present even when the reaction tanks fluid is being diverted to the cleaning of a filter. These fluids are constantly moving, where the fluid dynamics help the dispersion of solids as they are being broken down. The beneficial reuse fluid has a very suppressed pH (as low as 0.00) and an elevated oxidation reduction potential (ORP) as high as +900 mV. This beneficial reuse fluid (which is highly acidic and oxidative) can be moved to another storage tank for reinjection and/or pulled directly from the reaction tank itself.

During Step 125, the beneficial reuse fluid from Step 123 can be reinjected at different steps and between or after phases where the beneficial reuse chemical enhanced effluent ("BRUCE$^{2}$") will help further treat the saltwater as a catalyst to offset other chemistries, that contain a suppressed pH<0.99 from high concentration of hydrogen (H$^+$) ions and an oxidation reduction potential (ORP) of >+300.00 mV consisting of oxygen (O$^-$) ions, oxidants and carbon arrays and or other chelation chemistries available. These locations are between Step 107 [Phase #1] and Step 109 [Phase #2], Step 113 [Phase #3], Step 119 [Phase #4] and/or before Step 127. During Step 127, the post-treated fluid is now stabilized for storage for up to and longer than ninety (90) days. During Step 127, the treated and processed saltwater from Step 123 remains stable where bacteria levels remain suppressed, the pH remains stable, bicarbonate scales cannot form and the oxidation reduction potential (ORP) remains positive+mV and not sour from the uptake of sulfate (SO$_4^{2-}$) reducing bacteria referred to as SRB's that consume the oxygen from the sulfate (SO$_4^{2-}$) ion and allow for the sulfur (S$^-$) to attach to hydrogen (H$^+$) ions that form hydrogen sulfide (H$_2$S) or form scale as the bicarbonate (HCO$_3$) and total alkalinity as (CaCO$_3$) have been removed for up to and over ninety (90) days.

Figure 3:
FIG. 3 is a flow diagram of one embodiment of the invention.

FIG. 3 is a flow diagram of one embodiment of the invention. This embodiment follows the process illustrated in FIG. 2 and described above. Notably, FIG. 3 illustrates several chemical storage tanks [Phase 1, Phase 4, Phase 6], an oil storage tank and gun barrel [Phase 2], several injection ports, an above-ground storage tank [Phase 5], a mechanical filter [Phase 6], a valve tree [Phase 6], a cone bottom chemical reaction tank [Phase 6], and a beneficial reuse fluid storage tank, [Phase 6] a recirculation pump [Phase 6], among other units and plumbing. The various units are illustrated in greater detail in FIG. 3A and FIG. 3B and they are discussed further below.

FIG. 3A is an isolated view of a portion of the embodiment illustrated in FIG. 3. During Phase 1, raw saltwater enters the system at point 201 from one or more sources, which may include trucks, pipelines, etc. The volume and flow rate (velocity) of the water is measured using a flow meter 205. Isolation valves 203 exist before and after flow meter 205. Valves 203 can be controlled to adjust the flow of raw water. Valves 203 can also be closed in order to perform service work on meter 205.

In this embodiment, desired chemistries are added using injection quills so that the chemistries are injected directly into the middle of the pipe where the chemistries are forced to disperse through the entirety of water 217, 219. The chemistries are designed to pretreat raw saltwater to remove and separate hydrocarbons and protect hydrocarbons from oxidation and redox reactions that liberate divalent and trivalent cations, such as iron (Fe), reduce organics and bacteria and prevent additional suspended solids. The chemistries are stored in chemical storage tanks 207, 215 and these chemistries will be injected using chemical pumps 209, 213. Chemical pumps 209, 213 are set (and adjusted) to correspond the flow of the desired chemistries with the flow rate of the raw saltwater. This control can occur manually, or it can be automated. The operator can use programmable logic controller (PLC) 295 to facilitate automated control.

After passing the injection quills 217, 219, the raw saltwater enters Phase 2. During Phase 2, hydrocarbons (oil and gas) are mechanically separated from the raw saltwater. In this embodiment, the separation occurs using a mechanical separator 225, namely, gun barrel separator 225 assembly (having an external water leg 226). The operator, in some instances, may introduce a beneficial refuse fluid from Phase 6 (discussed below) at injection quill 221 to gun barrel separator 225. In some embodiments, the operator, may introduce a beneficial refuse fluid from Phase 6 (discussed below) immediately upstream of gun barrel separator 225. Hydrocarbons flow from the top of the gun barrel 225 to an oil storage tank 227. Water leaves from the bottom of the gun barrel through the external water leg 226 where it will continue through the system for further treatment.

These operating units facilitate removal and storage of hydrocarbons (oil). Pretreating the raw saltwater with desired chemistries before the removal of the hydrocarbons (oil) helps prevent the buildup of BS&W in the oil, souring of both the stored hydrocarbons (oil) 227 and saltwater.

During Phase 3, the post-treated saltwater leaves the gun barrel separator 225 and the residents time in the piping-before entering Phase 4 (discussed below)—allows for state changes from changes in pH and the oxidation, redox and chelation of cations that have charges>1.2$^e$ with the suspended solids that are inorganic and organic.

Phase 2 and Phase 3 are optional and not necessary in all embodiments of the invention. Phase 3 in this embodiment requires less equipment than the embodiment illustrated in FIG. 5.

During Phase 4, the stream of saltwater passes through flow meter 241. The flow rate (velocity) and volume of the water is measured. With the flow rate and volume measurements in mind, desired chemistries are added using injection quills 243, 245. This step is taken to distribute the chemistries into the middle of the pipe where the flowing saltwater, where the chemistries are used to further condition the water and allow for several orders of reactions to take place from changes in pH and the oxidation, redox and chelation of cations that have charges>1.2$^e$ with the inorganic and organic suspended solids and some dissolved solids. These chemistries are stored and drawn from chemical storage tanks 233, 237. These chemistries and combined chemistries are injected using chemical pumps 235, 239. The pumps are set (and adjusted) to correspond the flow of the desired chemistries with the flow rate of the saltwater passing through Phase 4. This control can occur manually, or it can be automated. The operator can use PLC 295 to facilitate automated control.

With the flow rate and volume measurements in mind, a specific quantity of beneficial reuse chemical enhanced effluent ("BRUCE$^2$") is introduced to the stream of saltwater at a fluid injection point 247. In this embodiment fluid injection point 247 exists downstream of injection quills 243, 245. After receiving the desired chemistries and BRUCE$^2$, the fluid enters Phase 5.

Figure 3B:
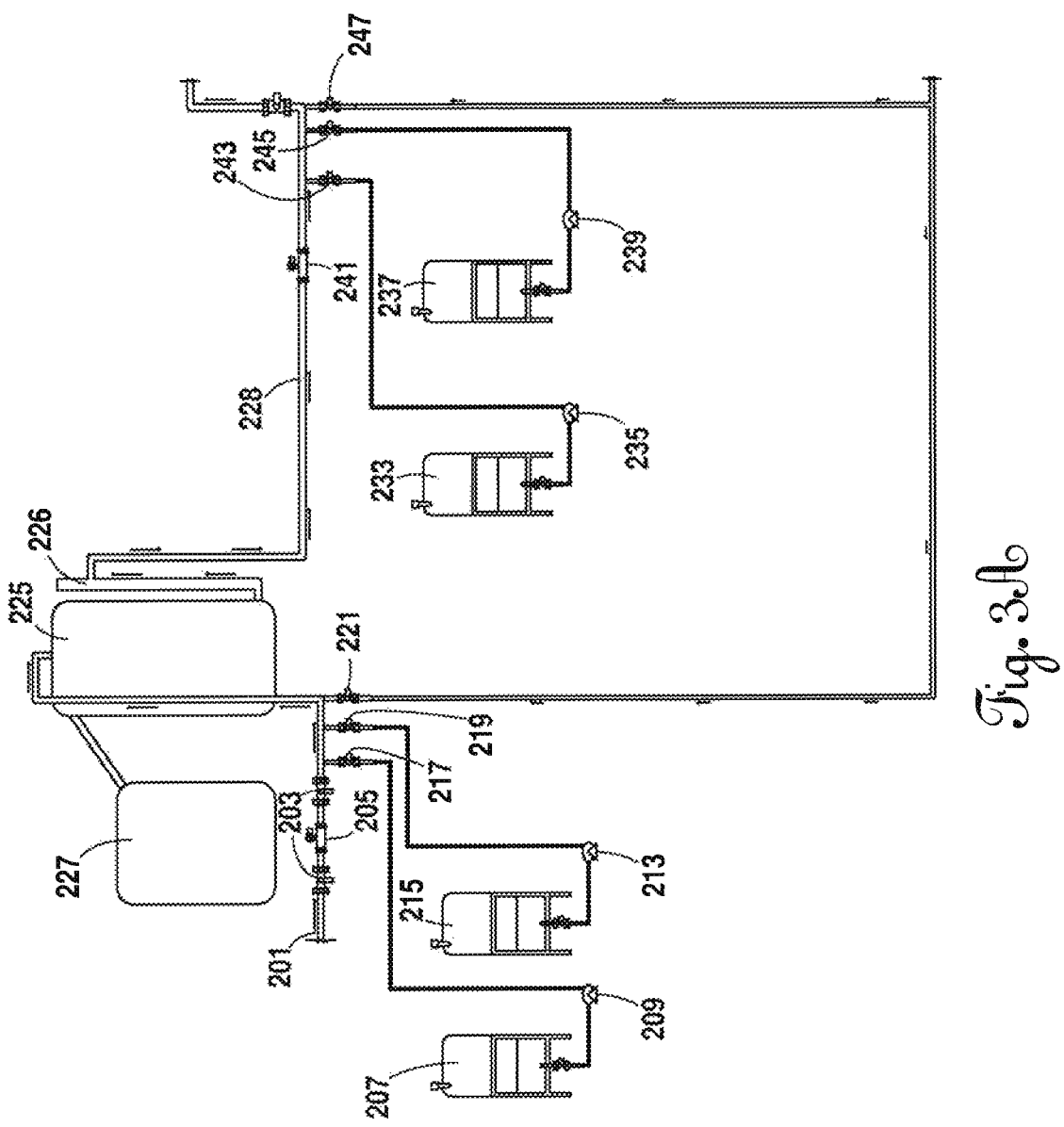
FIG. 3B is an isolated view of part of the embodiment illustrated in FIG. 3.
Figure 3B:
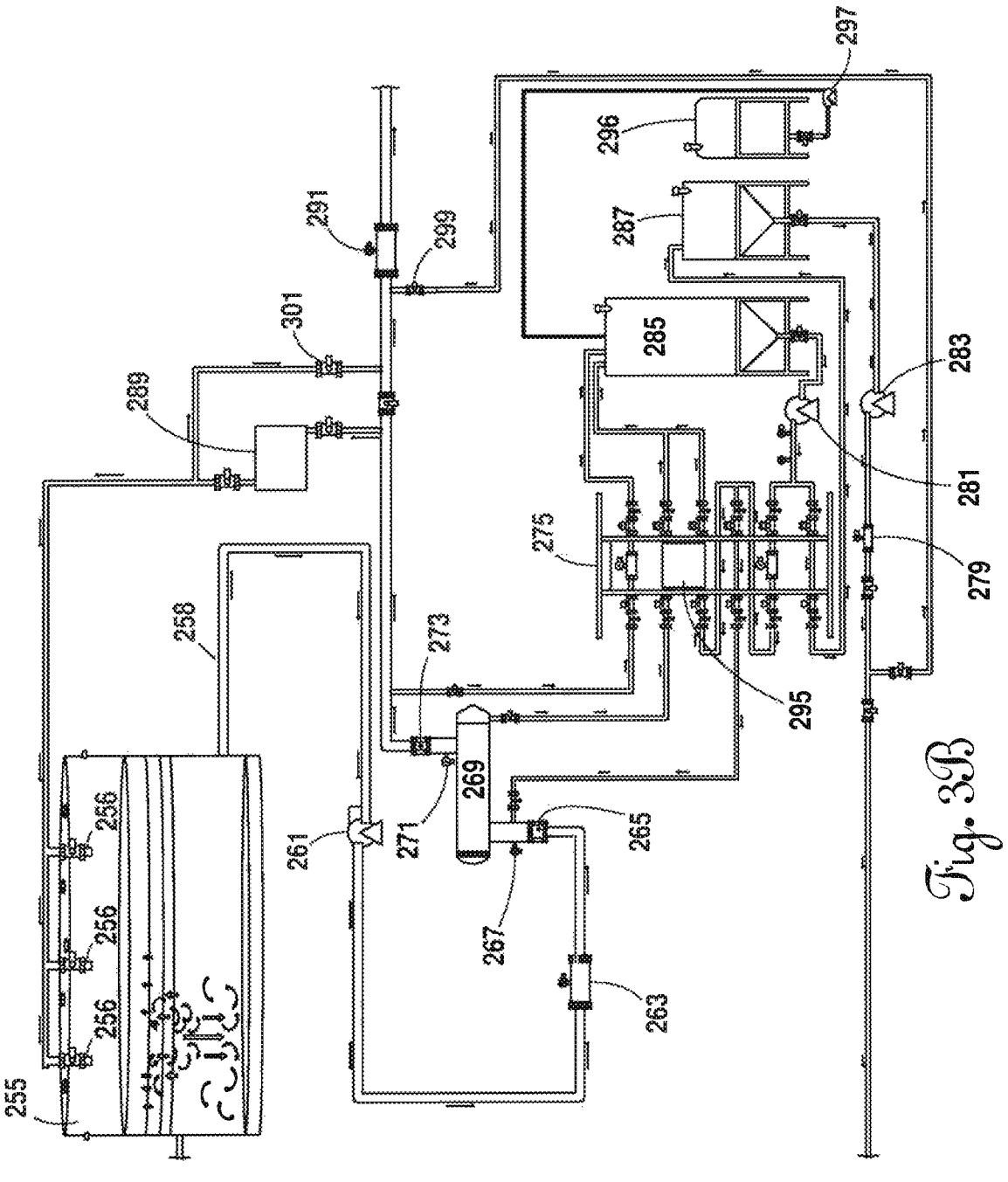

FIG. 3B is an isolated view of a portion of the embodiment illustrated in FIG. 3. FIG. 3B illustrates the components of Phase 5 and Phase 6. It illustrates the saltwater stream leaving Phase 4 as it enters Phase 5. FIG. 3B also illustrates BRUCE$^2$ leaving Phase 6 as it is directed to earlier phases.

During Phase 5, the chemically treated saltwater is introduced and stored in an above-ground storage tank 255, where it has additional residence and retention time to allow for the state changes within the water's matrix to take place from changes in pH and the oxidation, redox and chelation of cations that have charges>1.2$^e$. When possible and available, cascading and turning of fluids provides constant movement. Constant movement minimizes or eliminates areas of stagnation in or at the surface of the fluid. Stagnation is common in storage tanks and less than desirable. Slip stream 301 can be distributed on top of the stored fluid to prevent the stagnation of the stored treated saltwater. A slip stream of the effluent treated saltwater from the pumped process 261 flowing the mechanical mechanism 269 will be diverted 301 and returned on top of the saltwater above ground storage tank-AST 255. Specifically, the stream is returned above the stored treated saltwater levels, where it will always flow down through the stored saltwater in those tanks. A sensor array 289 is used in this embodiment to monitor the quality of the treated saltwater effluent, such as the pH, ORP, Conductivity, TDS, Temperature from the process and connected to the PLC 295. Water is sprayed from sprayers 256. Saltwater exits tank 255 through pipe 258 where it is directed to Phase 6.

During Phase 6 the chemically treated saltwater is pumped through transfer pump 261. It is directed to a mechanical separation unit to remove fine particles (e.g., dissolved air floatation-DAF, induce gas air flotation, up flow clarifier, weir tank or similar devices). In this embodiment, the water passes through filter 269, to collect the fine particles and conglomerate them. The flow rate (velocity)

and volume of the treated saltwater are measured by flow meter 263, which is used in the manual or automated mode for control and verification of flow.

The present invention incorporates clean-in place (CIP) technology in some embodiments, which adds to efficiency and ease of use. It also reduces downtime. Three matrixes are used to determine when a CIP function will take place. The three matrixes are time, volume of water as measured at the flow meter 263, delta $\Delta p$ from the inlet pressure measured at pressure meter 267 and the outlet pressure measured at pressure meter 271. This clean in place function takes the collected inorganic and organic particles that have been collected within the mechanical mechanism 269 and transports them out of that mechanical mechanism 269 and adds them to the BRUCE$^2$ reaction cone bottom tank that is constantly recirculating with a flow induced vortex 285. To carry out this process function, the flow through mechanical mechanism 269 is stopped. The mechanism is isolated from the main flow of saltwater by closing the inlet valve 265 and outlet valve 273. When valves 265, 273 are closed, a recirculation process that is constantly running in the cone bottom reaction tank is now transferred to the vessel takes place and the vortex within the reaction never stops. Water moves through the mechanical mechanism 269 and the BRUCE$^2$ reaction cone bottom tank 285 using the valve tree 275 and the regeneration tank recirculating pump 281. This occurs so that the collected solids in mechanical device 269 are subjected to the multiple chemical reactions in the regeneration tank 285.

Flow between the mechanical device 269 and the reactor 285 can be counter-flow or concurrent flow depending on the type of mechanical device 269 used to collect the solids. The designed flow rate and time across the mechanism will vary depending on the type of mechanical solids collection device 269 used, with the goal of lifting the collected suspended inorganic and organic solids and transporting them to the reaction cone bottom tank 285 for processing.

After the suspended organic and inorganic solids are moved from mechanical mechanism 269 to the reaction cone bottom tank 285, the recirculating process is diverted back on top of the reaction cone bottom tank 285 the using the valve tree 275. Additionally, the isolation from the main flow of saltwater is reversed by opening the closed inlet valve 265 and outlet valve 273. The mechanism is now open to the main flow of treated saltwater to repeat the process of collecting the fine particles. In this embodiment, the reaction cone bottom tank 285 will always have flow through it with the recirculating pump 281 pulling from the cone-shaped bottom of the reaction tank 285 and flowing through the valve tree 275 returning to the top of the reaction tank 285 with an angled return line to create a vortex within the recirculation of the reaction tank. This vortex in the center of the reaction cone bottom tank never stops 285. The vortex prevents foaming and aids in bringing air and any gases generated from chemical reactions such as carbon dioxide ($CO_2$) and or hydrogen sulfide ($H_2S$) into the fluid while preventing the off gassing of any entrained gases.

During recirculation of the reaction tank 285, all suspended solids—inorganic and organic—are returned to the solution as a disassociated and chelated suspended solid to become a stable dissolved solid as a cation and or anion. During this phase of the process, the pH of this fluid becomes additionally suppressed by harvesting released hydrogen ($H^+$) ions from disassociation and the chelation divalent and trivalent cations, and the break down of bicarbonate ($HCO_3$) to hydrogen ($H^+$) and oxygen ($O^-$) and carbon dioxide ($CO_2$) and the oxidative potential of the fluid increases due to the release of oxygen from the chelation of iron oxide ferrous ($Fe_2O_3$) and ferric ($Fe_3O_4$) where the individual iron atoms are chelated with a carbon array and other chelation chemistries and the oxygen is release as ozone ($O_3$) and ($O_4$). After multiple cleanings (the number depending on the properties of the fluid to be cleaned; chemistries; and operating specs), and regenerations, the reaction tank fluid will have suppressed pH and the oxidative potential will increase enough that it has enhanced beneficial reuse properties. The beneficial reuse chemical effluent (BRUCE$^2$) can be pumped through pump 283 and applied to a number of places such as, the inlet of the process in Phase 1 through injection quill 221, along with the chemistries used in Phase 4 using an injection quill 247 and also as a batch treatment for the effluent with an injection quill 299 into the treated saltwater from Phase 6 where the stored fluid will benefit from the beneficial reuse (BRUCE$^2$) treatment and help preserve the stored saltwater from souring with bacteria that produce hydrogen sulfide H2S through the reduction of sulfates ($SO_4{}^{2-}$).

The reaction cone bottom tank 285 fluid is transferred to a beneficial reuse chemical effluent (BRUCE$^2$) holding cone bottom tank 287 where it passes through a flow meter 279 to measure the flow rate (velocity) and volume as it is reinjected using a pump 283 as a beneficial reuse chemistry effluent-BRUCE$^2$ at locations via quills 221, 247, 299 discussed above. When fluid is removed from the reaction tank 285 and transferred to the reuse holding tank 287, the reaction tank 285 requires water as a replacement fluid. Valve tree 275 meters and controls the rate (velocity) and volume of the treated effluent from the mechanical mechanism 269 as the source for the recharging fluid volume.

After the volume of the fluid in the reaction cone bottom tank 285 is replaced, a regenerative chemistry consisting of an acid that provides a source of hydrogen ($H^+$), carbon arrays and or other chelation chemistries 296 is injected into the reaction tank so that the recirculating fluid matrix is recharged and able to continue the process of putting the collected suspended inorganic and organic solids back into solution as a dissolved solid and preventing the liberation of some divalent and trivalent cations such as iron (Fe) and or NORM that have charges greater than 1.2°. This chemistry is stored in chemical storage tanks 296 and the chemistry is injected using a chemical pump 297. This process function can be performed manually or automated using PLC 295. A slip stream of the effluent treated saltwater from the pumped process 261 flowing the mechanical mechanism 269 will be diverted 301 and returned on top of the saltwater above ground storage tank-AST 255. Specifically, the stream is returned above the stored treated saltwater levels, where it will always flow down through the stored saltwater in those tanks. An optional sensor array to measure pH, ORP, Conductivity, TDS, Temperature and others 289 is used in this embodiment to monitor the quality of the treated saltwater effluent from the process and connected to the PLC 295.

The system and process illustrated in FIG. 3, FIG. 3A, FIG. 3B, and the six (6) phases can be deployed in several sites, including a saltwater disposal well, a recycle reuse pit, or directly off a pipeline riser.

Figure 4:
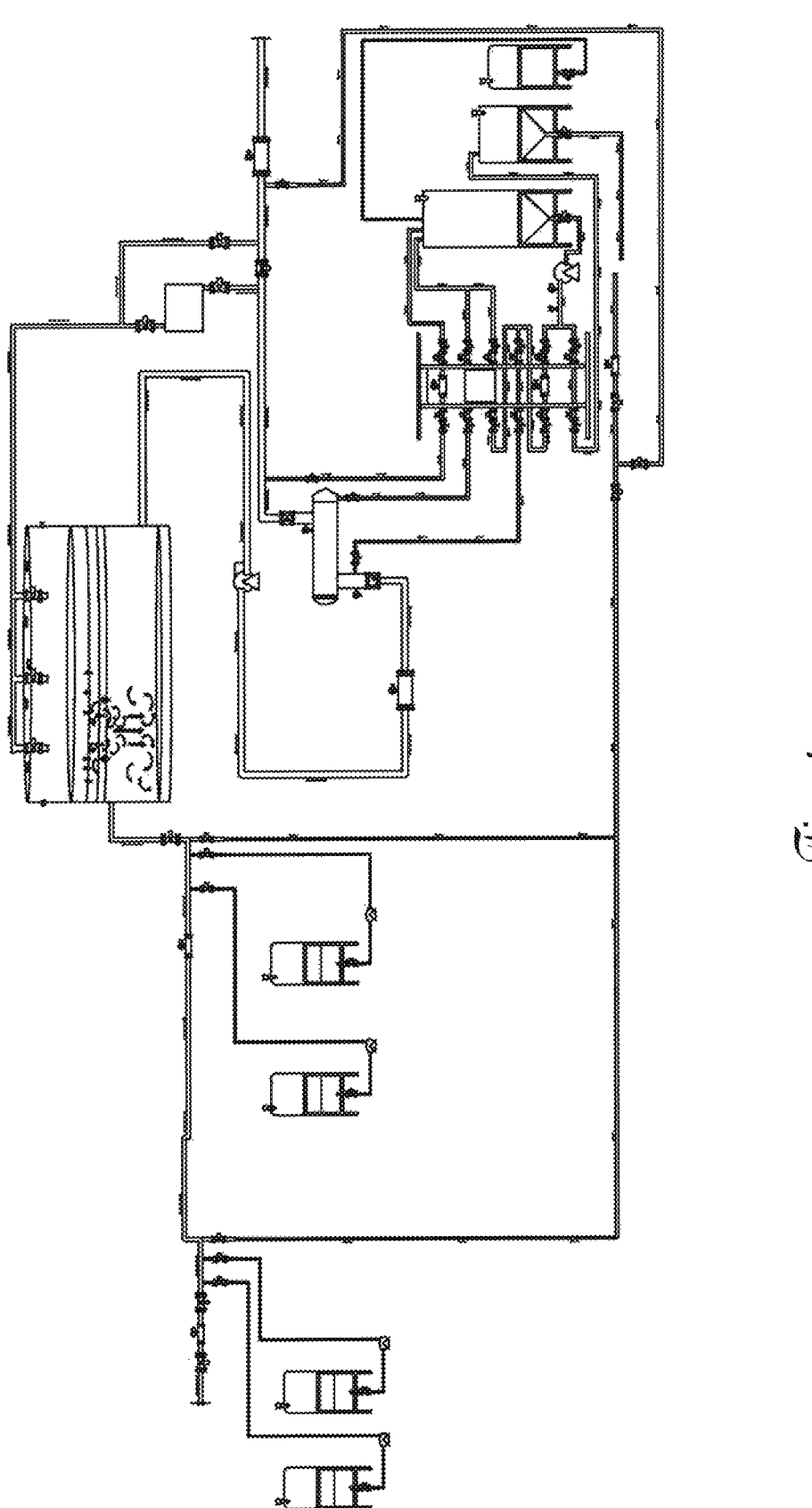
FIG. 4 is a flow diagram of one embodiment of the invention.

FIG. 4 is a flow diagram of one embodiment of the invention. This embodiment follows the process illustrated in FIG. 2 and described above. Notably, and like the embodiment illustrated in FIG. 3, FIG. 4 illustrates several chemical storage tanks [Phase 1, Phase 4, Phase 6], several injection ports, an above-ground storage tank [Phase 5], a mechanical filter [Phase 6], a valve tree [Phase 6], a chemical reaction tank [Phase 6], and a beneficial reuse fluid tank

Figure 4B:
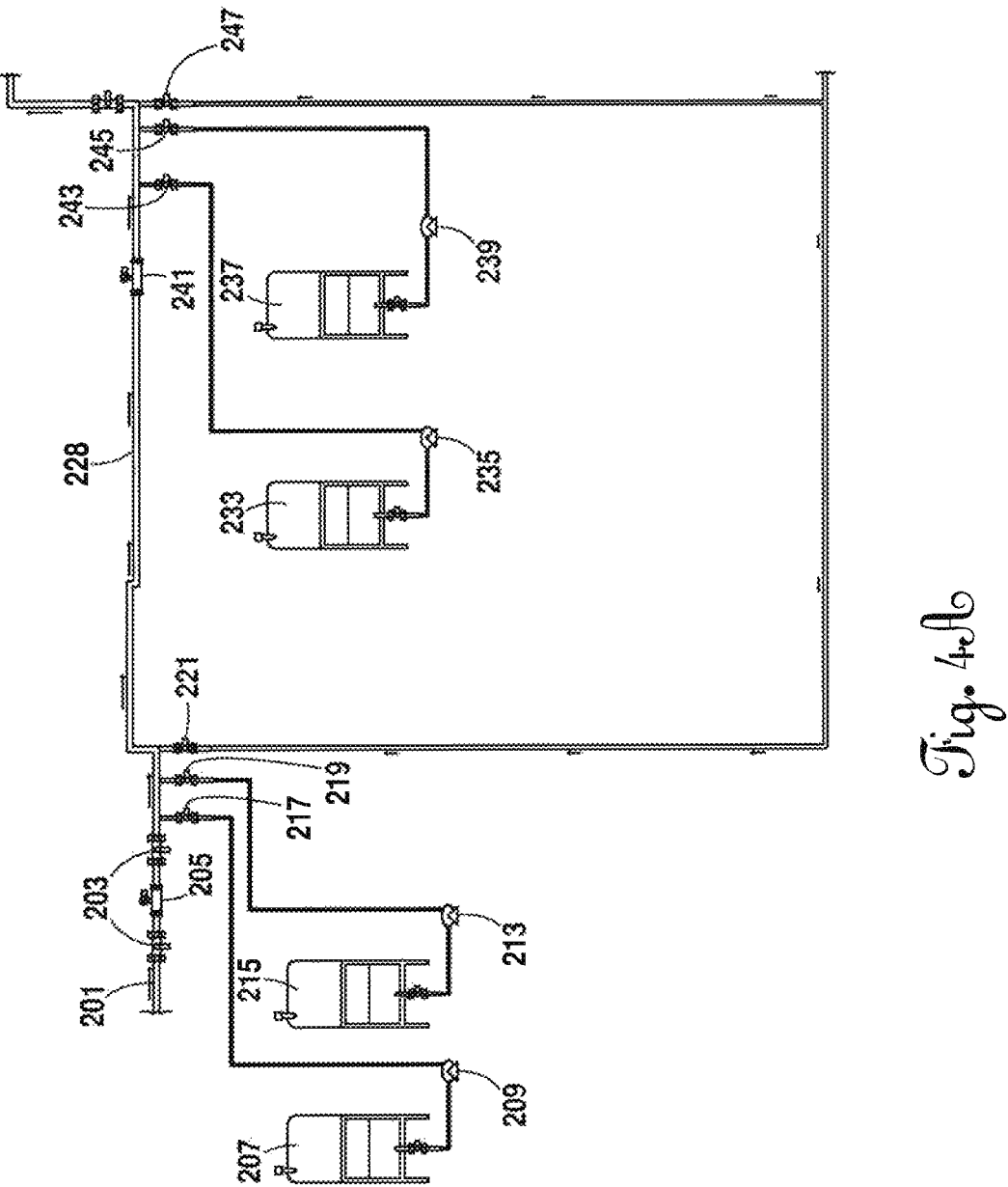
FIG. 4B is an isolated view of part of the embodiment illustrated in FIG. 4.
Figure 4B:
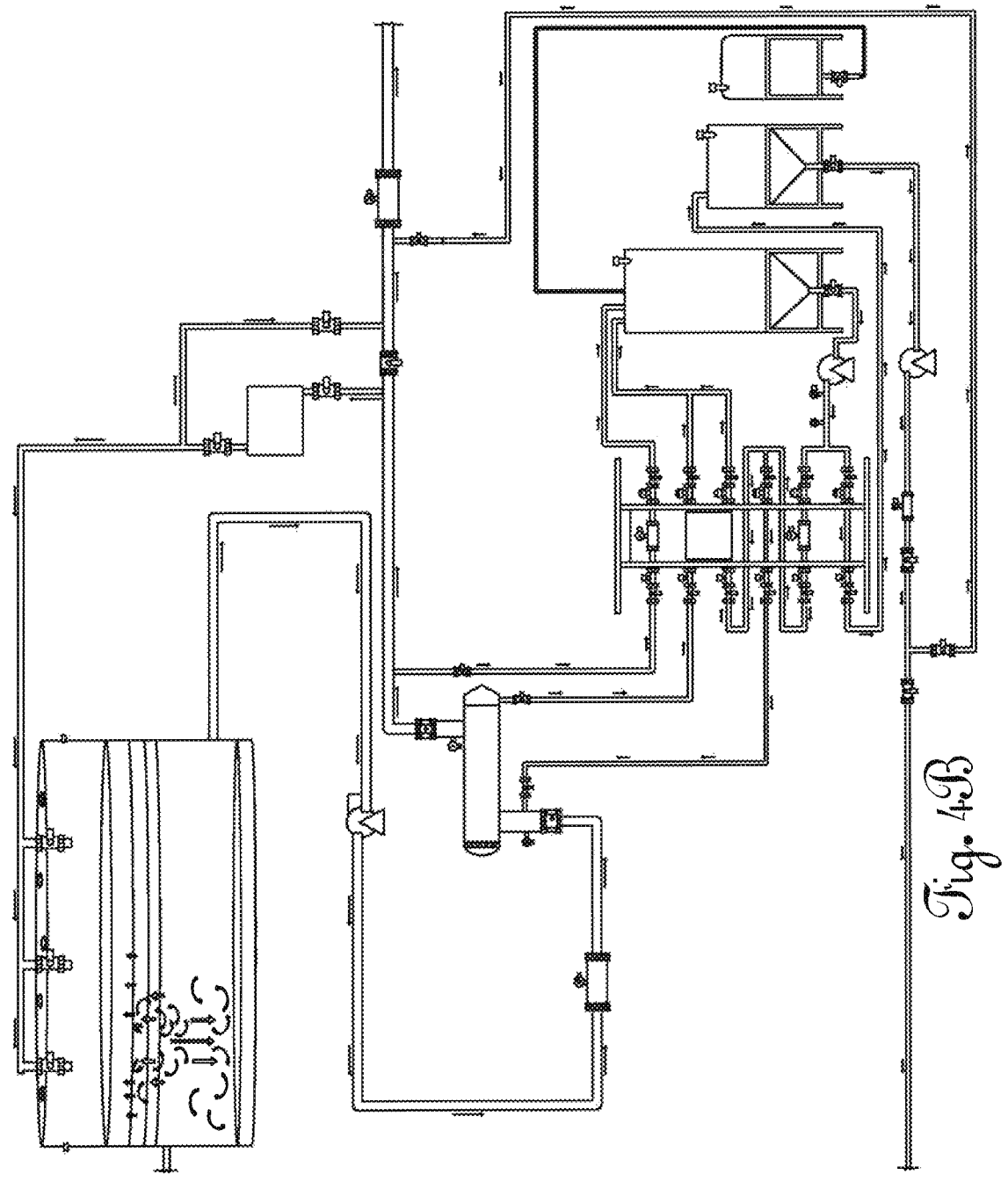

[Phase 6], among other units and plumbing. Unlike the embodiment shown in FIG. 3, however, the embodiment shown in FIG. 4 does not contain an oil storage tank nor a gun barrel [Phase 2]. The various units are illustrated in greater detail in FIG. 4A and FIG. 4B and are discussed further below.

FIG. 4A is an isolated view of a portion of the embodiment illustrated in FIG. 4. During Phase 1, raw saltwater enters the system at point 201 from one or more sources, which may include trucks, pipelines, etc. The volume and flow rate (velocity) of the water is measured using a flow meter 205. Isolation valves 203 exist before and after flow meter 205. Valves 203 can be controlled to adjust the flow of raw water. Valves 203 can also be closed for the operator to perform service work on the meter 205.

In this embodiment, desired chemistries are added using injection quills so that the chemistries are injected directly into the middle of the pipe where the chemistries are forced to disperse through the entirety of water 217, 219. The chemistries are designed to pretreat raw saltwater to remove and separate hydrocarbons, and protect hydrocarbons from oxidation and redox reactions that liberate divalent and trivalent cations, such as iron (Fe), reduce organics and bacteria to prevent additional suspended solids from forming. The chemistries are stored in chemical storage tanks 207, 215 and these chemistries will be injected using chemical pumps 209, 213. Chemical pumps 209, 213 are set (and adjusted) to correspond the flow of the desired chemistries with the flow rate of the raw saltwater. This control can occur manually, or it can be automated. The operator can use PLC 295 to facilitate automated control.

The primary distinction between the embodiments shown in FIG. 3 and FIG. 4 occurs at this point in the process. Specifically, the pretreated raw saltwater foregoes Phase 2. This embodiment of the invention does not provide for a mechanical separation of hydrocarbons.

The operator, at times, introduces a beneficial refuse fluid from Phase 6 to the pretreated raw saltwater at injection quill 221.

Next, the saltwater enters Phase 3. During Phase 3, the saltwater passes through piping 228. The residents time in the piping 228—before entering Phase 4 from changes in pH and the oxidation, redox and chelation of cations that have charges>$1.2^e$ allows for state changes with the suspended solids that are inorganic and organic. As discussed below with respect to the embodiment in FIG. 5, water storage tank would be available and more applicable for Phase 3 if water storage tanks were used in Phase 5—as opposed to above ground storage tank(s) here.

From here, the remainder of the process carried out in the embodiment of Phase 4 remains the same as the embodiment shown in FIG. 3. Stated differently, Phase 4, Phase 5, and Phase 6 remain the same.

FIG. 5 is a flow diagram of one embodiment of the invention. This embodiment follows the process illustrated in FIG. 2 and described above. Notably, and like the embodiment illustrated in FIG. 3, FIG. 5 illustrates several chemical storage tanks [Phase 1, Phase 4, Phase 6], several injection ports, gun barrel and oil storage tank [Phase 2], a mechanical filter [Phase 6], a valve tree [Phase 6], a chemical reaction cone bottom tank [Phase 6], and a beneficial reuse fluid cone bottom tank [Phase 6], among other units and plumbing. Unlike the embodiment shown in FIG. 3, the embodiment shown in FIG. 5 does not contain an above-ground storage tank [Phase 5]. Instead, Phase 5 is carried out in a plurality of water storage tanks. Also, this embodiment comprises two water tanks immediately downstream of the gun barrel separator and external water leg [Phase 3]. The various units are illustrated in greater detail in FIG. 5A and FIG. 5B and are discussed further below. This distinction illustrates one benefit of the present invention in that it can readily accommodate existing infrastructure on site (e.g., AST versus water storage tanks), which lowers capital requirements.

Figure 5A:
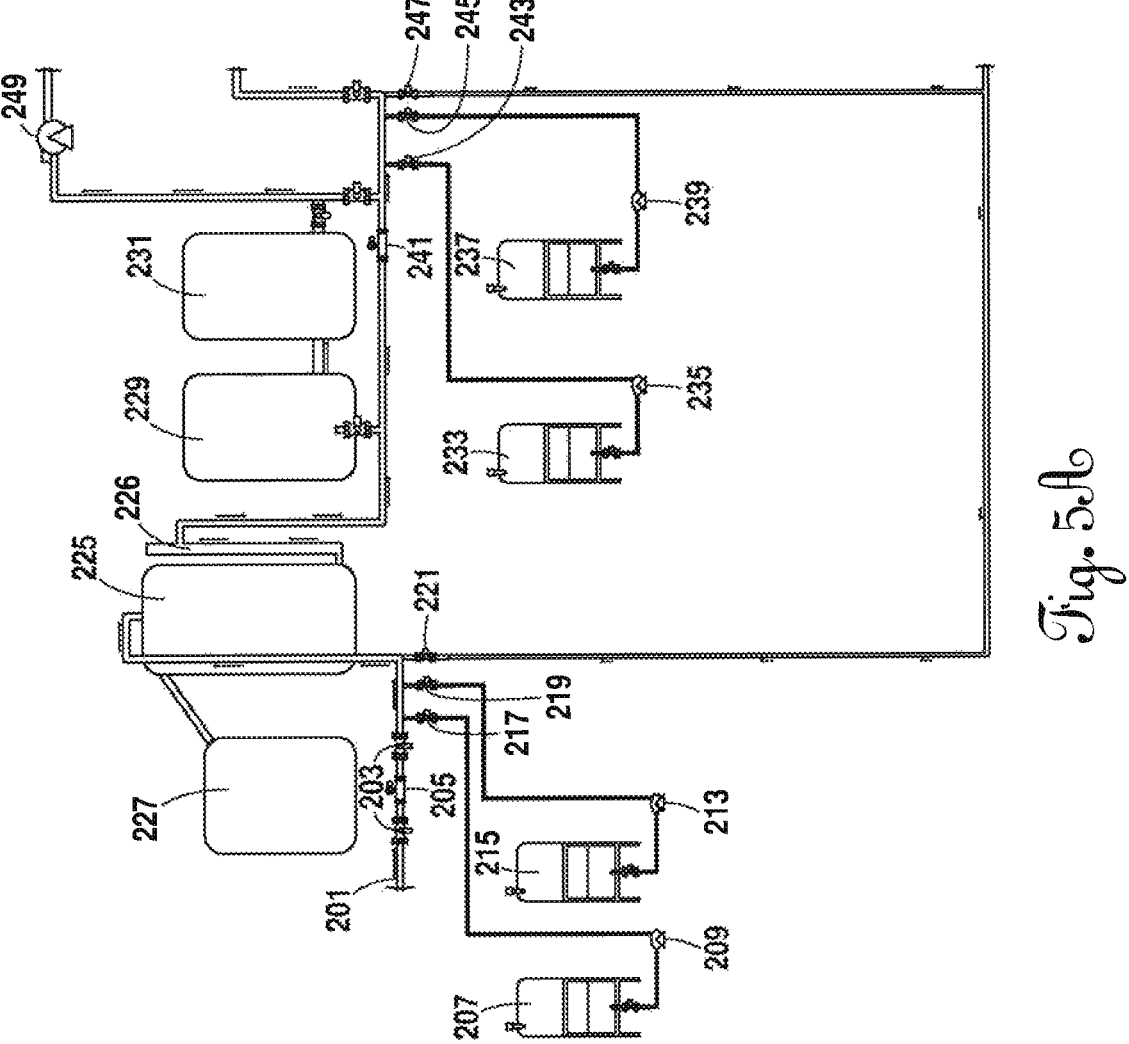
FIG. 5A is an isolated view of part of the embodiment illustrated in FIG. 5.
Figure 5B:
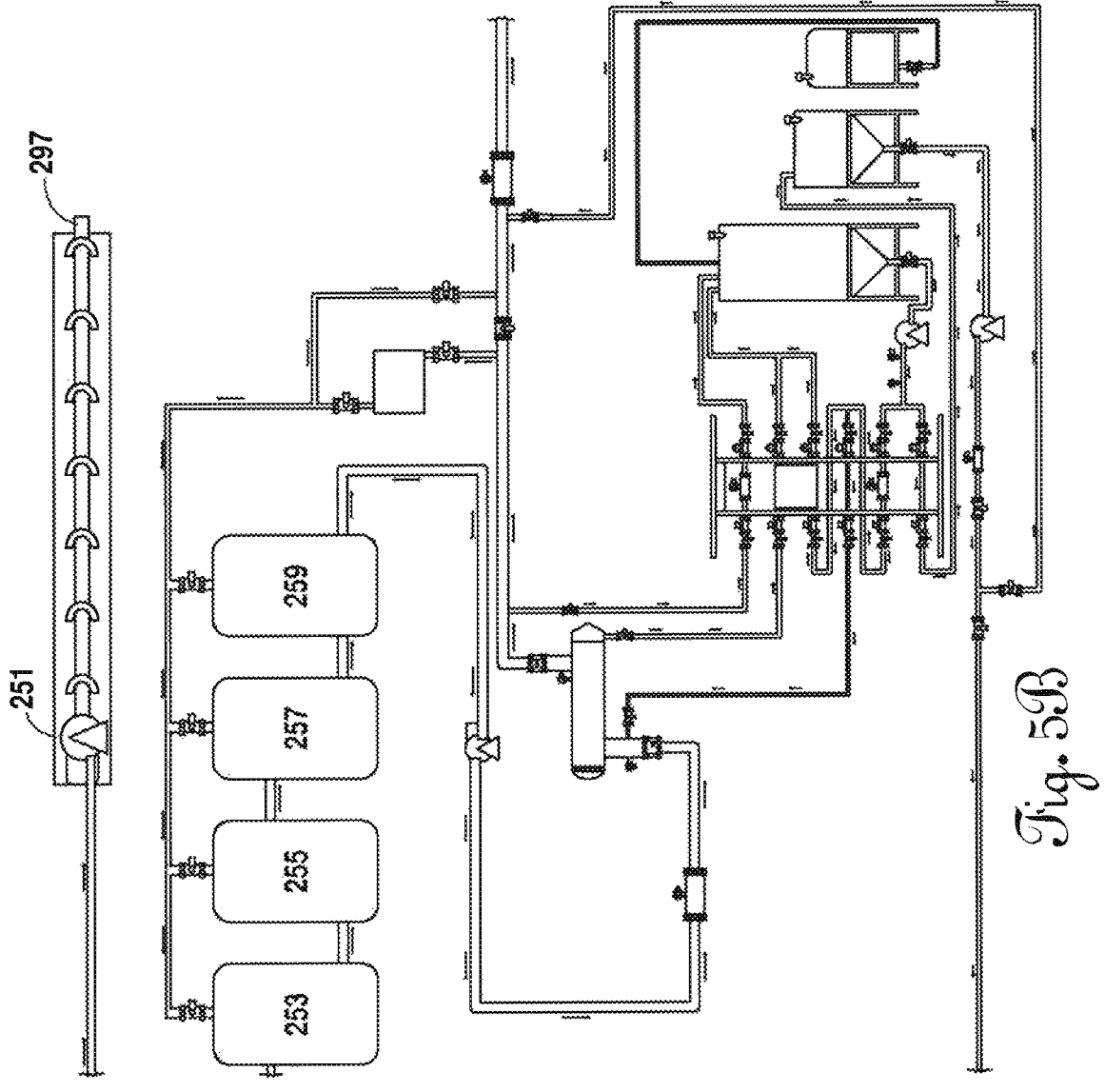
FIG. 5B is an isolated view of part of the embodiment illustrated in FIG. 5.

FIG. 5A is an isolated view of a portion of the embodiment illustrated in FIG. 5. During Phase 1, raw saltwater enters the system at point 201 from one or more sources, which may include trucks, pipelines, etc. The volume and flow rate (velocity) of the water is measured using a flow meter 205. Isolation valves 203 exist before and after flow meter 205. Valves 203 can be controlled to adjust the flow of raw water. Valves 203 can also be closed in order for the operator to perform service work on the meter 205.

In this embodiment, desired chemistries are added using injection quills so that the chemistries are injected directly into the middle of the pipe where the chemistries are forced to disperse through the entirety of water 217, 219. The chemistries are designed to pretreat raw saltwater to remove and separate hydrocarbons, reduce organics and prevent additional suspended solids, and protect hydrocarbons from oxidation and redox reactions that liberate divalent and trivalent cations, such as iron (Fe), reduce organics and bacteria The chemistries are stored in chemical storage tanks 207, 215 and these chemistries will be injected using chemical pumps 209, 213. Chemical pumps 209, 213 are set (and adjusted) to correspond the flow of the desired chemistries with the flow rate of the raw saltwater. This control can occur manually, or it can be automated. The operator can use PLC 295 to facilitate automated control.

After passing the injection quills 217, 219, the stream may receive a dose of beneficial reuse fluid (BRUCE$^2$). The raw saltwater then enters Phase 2. During Phase 2, hydrocarbons (oil and gas) are mechanically separated from the raw saltwater. In this embodiment, the separation occurs using a mechanical separator 225, namely, gun barrel separator 225 assembly (having an external water leg 226). Hydrocarbons flow from the top of the gun barrel 225 to an oil storage tank 227. Water leaves from the bottom of the gun barrel through the external water leg 226 where it will continue through the system for further treatment.

Hydrocarbons (oil) are removed and stored in one or more post-separation storage tanks. Pretreating the raw saltwater with desired chemistries before the removal of the hydrocarbons (oil) helps prevent the souring of both the stored hydrocarbons (oil) 227 and saltwater in the post-separation storage tanks 229, 231. When the saltwater leaves the gun barrel 225, it passes through the external water leg 226 until it enters the water storage tanks 229, 231.

During Phase 3, the post-treated saltwater is stored in the water storage tanks 229, 231. The residents time allows for state changes with the suspended solids that are inorganic and organic. During this phase, the operator may choose to divert the treated saltwater water from the rest of the treatment system and dispose of it through charge pump 249. From the charge pump 249, the water passes through the horizontal multistage surface pumping system (i.e., H pump) 251 and the water is injected into a saltwater disposal well 297. The water storage tanks 229, 231, and subsequent charge pump, H pump, and saltwater disposal well are two of the primary differences between the embodiment illustrated in FIG. 5 versus FIG. 3.

Water that is not disposed through the charge pump, H pump, and into a saltwater disposal well, is directed to Phase 4. Phase 4 remains the same as the embodiments shown in FIG. 3 and FIG. 4.

Phase 5 involves different operating units in this embodiment as compared to the embodiment of FIG. 3 and FIG. 4. Rather than using an above ground storage tank, this embodiment comprises a plurality of water storage tanks 253, 255, 257, 259. The additional residence and retention time during Phase 5 allows for state changes within the water's matrix. When possible and available, the cascading and turning of fluids within water storage tanks 253, 255, 257, 259 improves operability of the process. Cascading and turning is further facilitated by spraying a slip stream of fluid across the top of the water storage tanks using sensor array 285 and pulling the fluid from the stream existing the mechanical filter. Cascading and turning the water provides constant movement and avoids areas of stagnation or surface areas of the saltwater that otherwise have no movement and become stagnant. The saltwater exits tank 259 and enters Phase 6.

From here, the remainder of the process carried out in the embodiment of Stated differently, Phase 6 remains the same.

Figure 6:
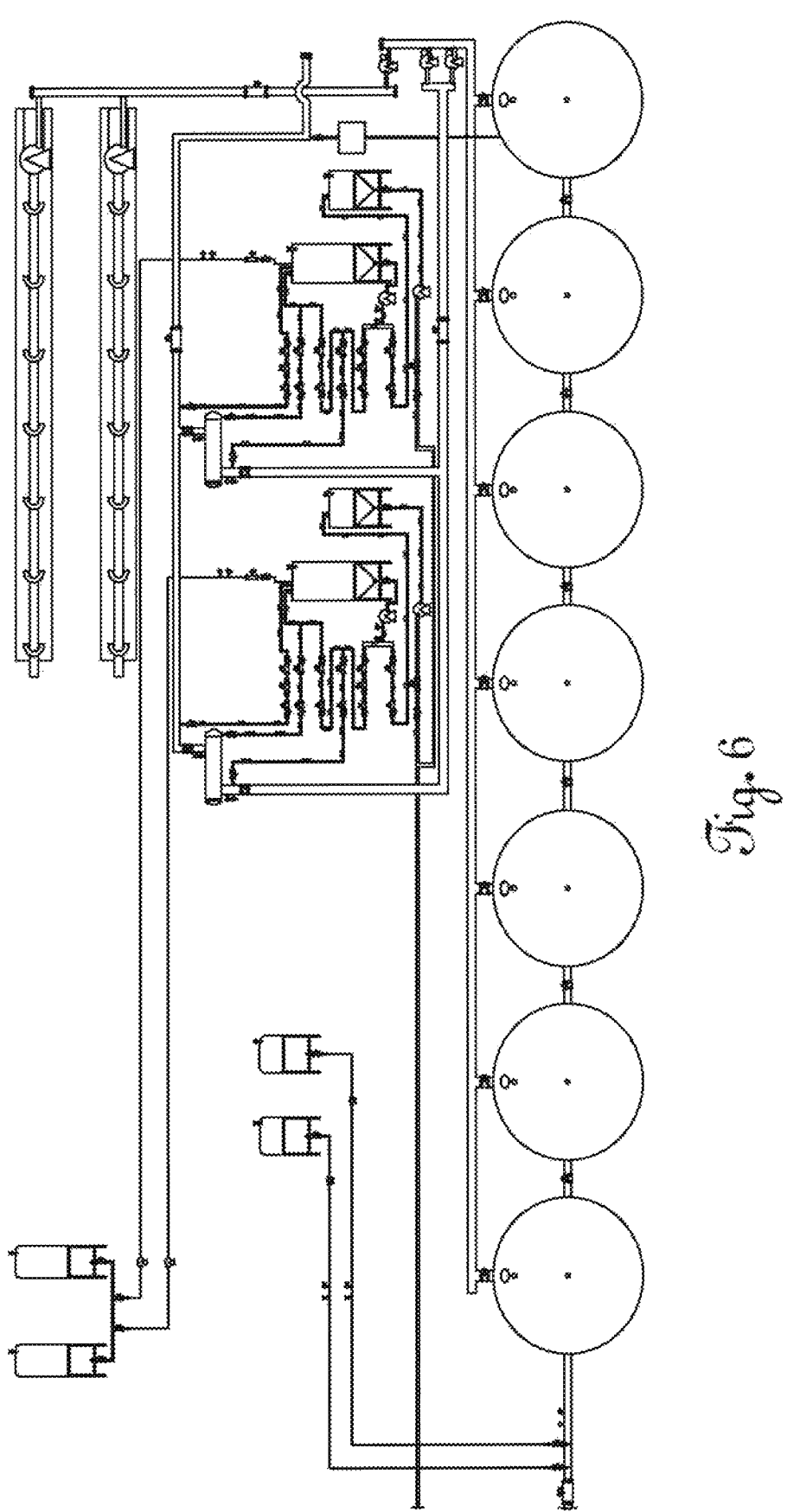
FIG. 6 is a flow diagram of one embodiment of the invention.

FIG. 6 is a flow diagram of one embodiment of the invention. This embodiment follows the process illustrated in FIG. 2 and described above. FIG. 6 does not illustrate the steps that are carried out in Phase 1, Phase 2, Phase 3. It also does not illustrate the recycling of BRUCE$^2$ during Phase 4 (which, although not illustrated in FIG. 6, can occur in this embodiment). The primary distinction between this embodiment and the embodiments previously discussed is the use of two Phase 6 assemblies, which reduce—if not eliminate—downtime for cleaning the mechanical filter, all of which is discussed in greater detail below. The various units are illustrated in greater detail in FIG. 6A and FIG. 6B and are discussed further below.

Figure 6A:
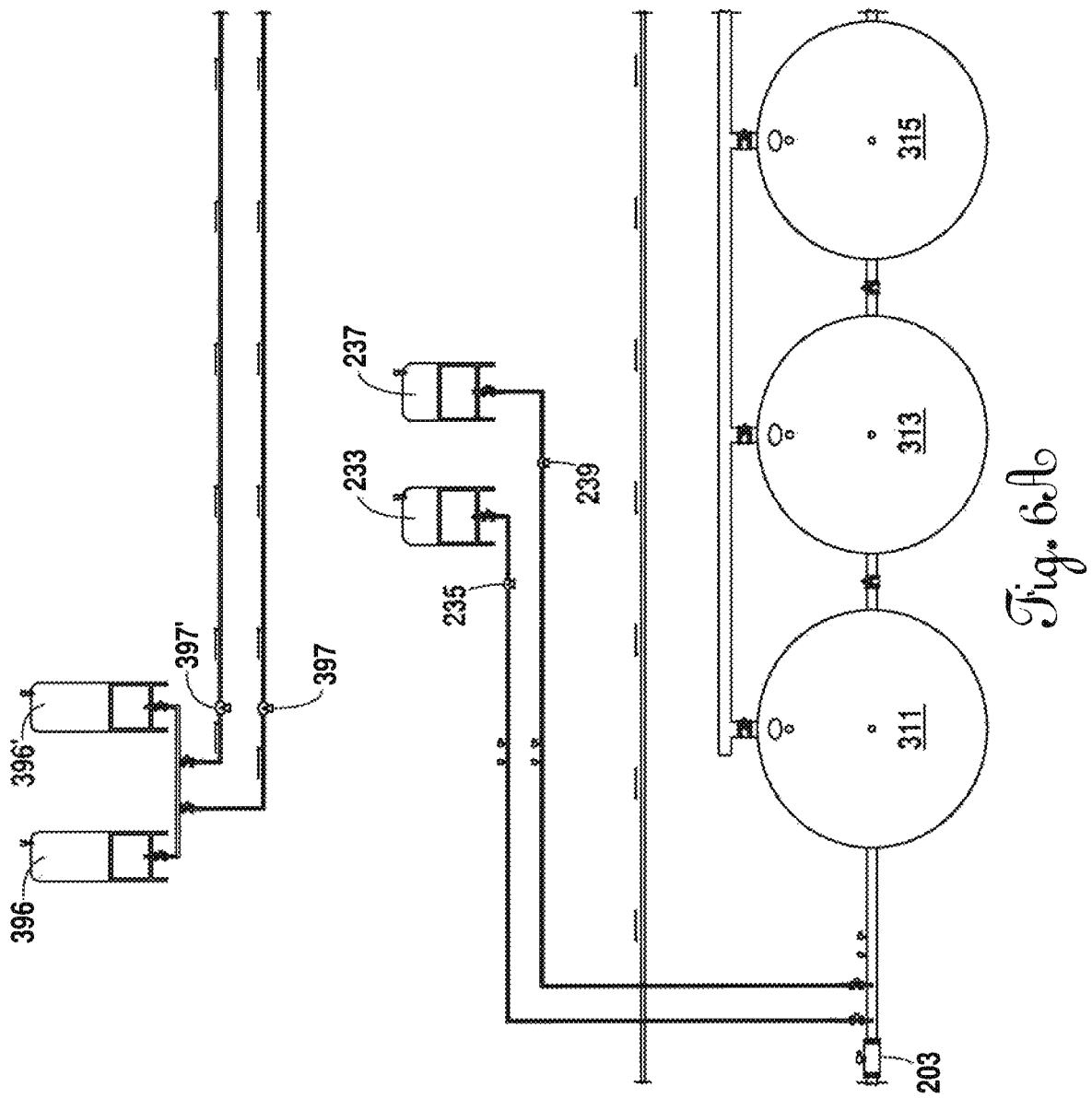
FIG. 6A is an isolated view of part of the embodiment illustrated in FIG. 6.

FIG. 6A is an isolated view of a portion of the embodiment illustrated in FIG. 6. FIG. 6A illustrates the delivery of salt water that has completed Phase 1, Phase 2 (if applicable), Phase 3 (if applicable). The saltwater passes through isolation valve 203. The salt water is then treated with desired chemistries 233, 237 pursuant to Phase 4. Although not shown in this figure, the saltwater stream may receive a dose of BRUCE$^2$. In general, the steps that are carried out in Phase 1, Phase 2, Phase 3 of this embodiment are largely the same as those steps as illustrated and described in FIG. 3, FIG. 4, FIG. 5. Of course, one of ordinary skill in the art could substitute the particular chemistries, the type of oil separation, and water storage techniques to accomplish those goals.

After the salt water receives the chemical treatment in Phase 4, it proceeds to Phase 5. In this embodiment, the saltwater passes through a plurality of water storage tanks 311, 313, 315, 317, 319, 321, 323. The additional residence and retention time during Phase 5 allows for state changes within the water's matrix. When possible and available, the cascading and turning of fluids within water storage tanks 311, 313, 315, 317, 319, 321, 323 improves operability of the process. Cascading and turning the water provides constant movement and avoids areas of stagnation or surface areas of the saltwater that otherwise have no movement and become stagnant.

Figure 6B:
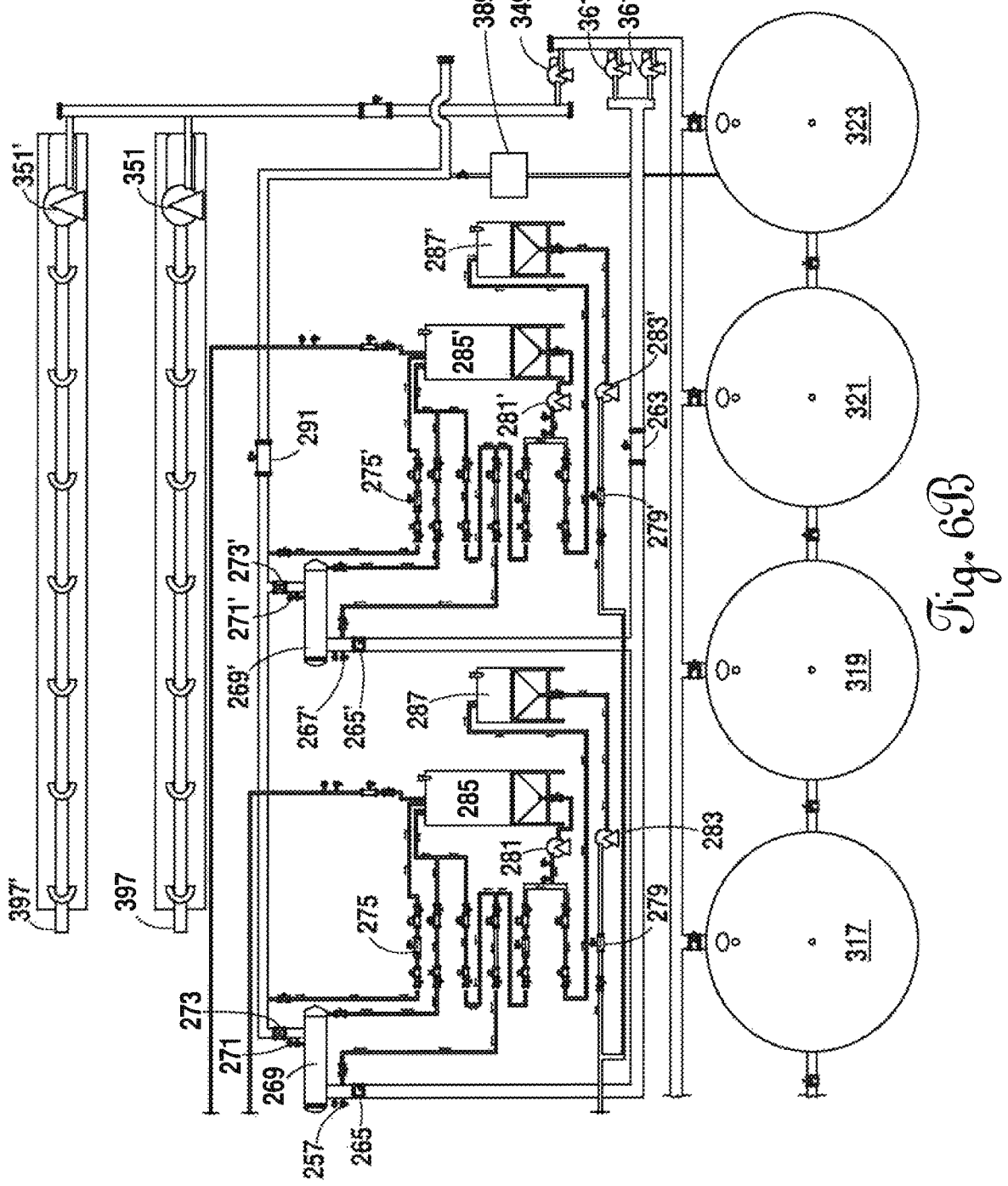
FIG. 6B is an isolated view of part of the embodiment illustrated in FIG. 6.
Figure 7:
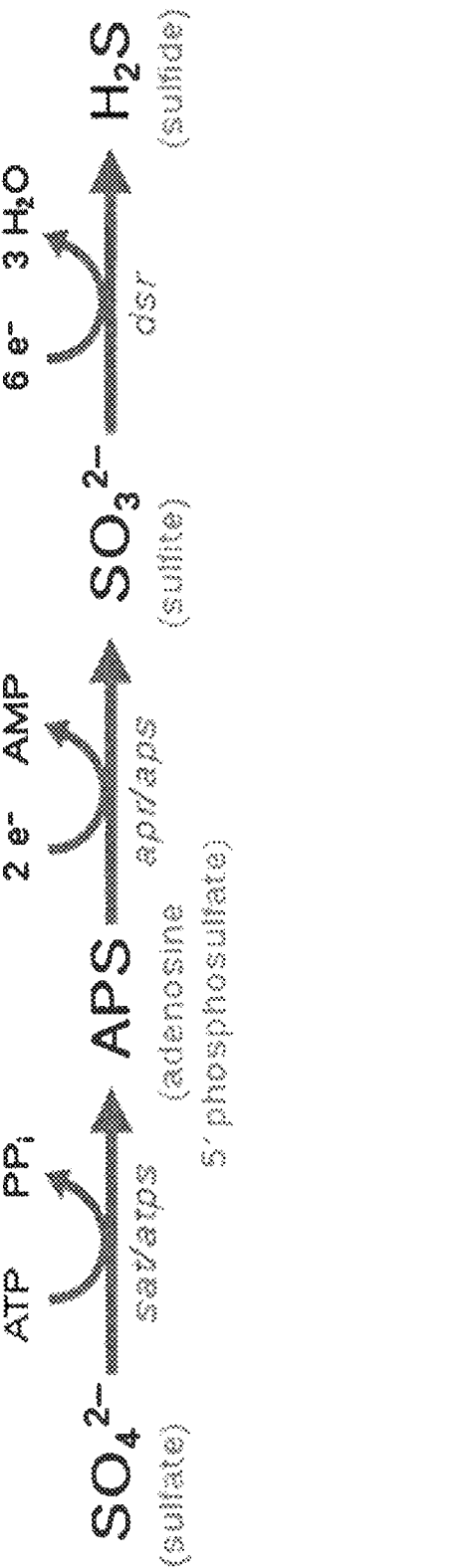
FIG. 7 is a schematic diagram illustrating the dissimilatory sulfate reduction pathway utilized by sulfate-reducing bacteria, showing the enzymatic conversion of sulfate to adenosine 5' phosphosulfate by sulfate adenylyltransferase (sat/atps), the subsequent conversion of adenosine 5' phosphosulfate to sulfite by adenylylsulfate reductase (apr/aps), and the final conversion of sulfite to sulfide by dissimilatory sulfite reductase (dsr).

FIG. 6B illustrates saltwater entering tank 317 and continuing into the remaining tanks 319, 321, 323. An optional sensor array 389 is used in this embodiment to monitor the quality of the treated saltwater effluent from the process and connected to the PLC 395 (when automation is used). If the operator and/or process control (per specified protocol) are not satisfied with the contents of the water in tank 323, a slip stream of fluid post mechanical filter 269, 269' and otherwise in route to exit the system can be delivered to tanks 311, 313, 315, 317, 319, 321, 323. In particular, the slip stream of fluid is sprayed across the surface of one or more of the tanks.

The saltwater exits tank 323 and either enters Phase 6 or is diverted to a saltwater disposal injection process. Water diverted to the saltwater disposal ("SWD") injection process, passes through SWD charge pump 349 and is directed to one or both SWD H pumps 351, 351'. The water is then directed to the injection well.

During Phase 6, saltwater passes through pumps 361, 361', which operate in parallel, and subsequently flow meter 263. After the saltwater passes through flow meter 263, it is directed to a primary skid, and when necessary, a secondary skid. FIG. 6 illustrates two skids, each of which contains its own mechanical filter, reaction cone bottom tank, BRUCE$^2$ storage tank, valve tree, and related pumps and plumbing. FIG. 6 as illustrated, is agnostic as to which skid is the primary skid, and which skid is the secondary skid. For purposes of this discussion, however, the skid on the left is the primary skid and the skid on the right is the secondary skid. Reference numbers denoting operating units/equipment in the secondary skid contain an apostrophe (e.g., reference number "285'" designating the reaction tank in the secondary skid).

After the water passes through flow meter 263, it is directed to a mechanical separation unit to remove fine particles (e.g., dissolved air floatation-DAF, induce gas air flotation, up flow clarifier, weir tank or similar devices). In this embodiment, the water passes through filter 269, to collect the fine particles and conglomerate them. The flow rate (velocity) and volume of the treated saltwater are measured by flow meter 263, which is used in the manual or automated mode for control and verification of flow. Phase 6 continues in this manner largely the same way as described above with respect to FIG. 3. Water exits Phase 6 by being directed out of the system (e.g., to large above ground storage tanks (AST) and produced water storage pits (PWSP) to house and build inventory); or recycling BRUCE$^2$ to salt water in Phase 1 and Phase 4.

The primary difference between this embodiment and the embodiments illustrated in FIG. 3, FIG. 4, FIG. 5, with respect to Phase 6, is that Phase 6 contains the primary skid and the secondary skid. When the secondary skid is engaged, and after the water passes through flow meter 263, it is directed to a secondary mechanical separation unit to remove fine particles (e.g., dissolved air floatation-DAF, induce gas air flotation, up flow clarifier, weir tank or similar devices). That is, the water passes through secondary filter 269, to collect the fine particles and conglomerate them. Phase 6 continues in this manner largely as the same was as described above with respect to FIG. 3.

By using two skids, the present invention better facilitates clean in place (CIP) technology, which improves efficiency and ease of use. It also reduces downtime. Three matrixes are used to determine when a CIP function will take place. The three matrixes are time, volume of water as measured at the flow meter 263, delta $\Delta p$ from the inlet pressure measured at pressure meter 267, 267' and the outlet pressure measured at pressure meter 271, 271'. This clean in place function takes the collected inorganic and organic particles that have been collected within the mechanical mechanism 269, 269' and transports them out of that mechanical mechanism 269, 269' and adds them to the BRUCE$^2$ reaction cone bottom tank 285, 285'. To carry out this process function, flow through mechanical mechanism 269, 269' is stopped. The mechanism is isolated from the main flow of saltwater by closing the inlet valve 265, 265' and outlet valve 273, 273'. When valves 265, 265', 273, 273' are closed, a recirculation process takes place. Water moves through the mechanical mechanism 269, 269' and the BRUCE[2] reaction cone bottom tank 285, 285' using the valve tree 275, 275' and the regeneration tank recirculating pump 281, 281'. This occurs so that the collected solids in the mechanical device 269, 269' are subjected to chemical reaction in the regeneration cone bottom tank 285, 285'.

Flow between the mechanical device and the reactor can be counter-flow or concurrent flow depending on the type of mechanical device used to collect the solids.

In some embodiments, the operator may choose to alternate between the primary skid and secondary skid on a 50-50 basis. However, it is anticipated that the operator may prefer a greater disparity between the respective operating times of the primary skid and the secondary skid.

In some embodiments, the mechanical filter will contain a wastegate, which aids with clean in place processes.

These chemistries are stored in tanks 207, 215 for Phase 1, 233, 237 for Phase 4, and 285, 396, 396 for Phase 6.

Applicant incorporates by reference the invention disclosed in U.S. patent application Ser. No. 18/463,651 filed on Sep. 8, 2023, and entitled "Gun Barrel, Separator, and Above Ground Storage Tank Recirculation and Nozzle Assembly" (the '651 Application). The applicant intends for the invention disclosed in the '651 Application to be used in some embodiments of the present invention.

In some embodiments, the invention involves a process for separating solids and oil from water comprising the steps of: introducing a beneficial reuse chemical effluent that has an abundance of hydrogen ions ($H^+$), oxygen ($O^-$) ions, carbon arrays, chelating agents into a stream of water that has been treated with acid to provide additional hydrogen ($H^+$) ions and alcohols, ethoxylated alcohols to form a first reuse treatment stream; directing the first reuse treatment stream to an oil separation process, which outputs at least an oil and gas outlet stream and a separated first reuse treatment stream; treating the separated first reuse stream with an oxidizer to provide a source of additional oxygen from the oxidizers and or libertate oxygen from redox, where the chelated divalent and trivalent cations such as iron oxide as ferrous ($Fe_2O_3$) and or iron oxide as ferric ($Fe_3O_4$) that has the iron (Fe) atoms chelated by a carbon array or other chelation chemistries and the bound oxygen is liberated as ozone ($O_3$) and ($O_4$) and an acid that supplies additional hydrogen ($H^+$) ions to form a twice-treated reuse treatment stream; introducing a beneficial reuse chemical effluent into the twice-treated reuse treatment stream to form a second reuse treatment stream; passing the second reuse treatment stream through one or more storage tanks to form a pre-filter stream; directing the pre-filter stream through a solids collection device and removing a post-filter stream; directing the post-filter stream into a chemical reactor where it is treated with a stream of a strong acid such as hydrogen chloride (HCl), acetic acid ($CH_3COOH$), phosphoric acid ($H_3PO_4$) that has a bonded carbon array to prevent the hydrogen from potentiating and forming the hydronium ion ($H_3O$) and there by sequestering the hydrogen until a desire charge reaction with other ions in the water is present such as iron sulfide (FeS), iron carbonate ($FeCO_3$) and calcium carbonate ($CaCO_3$) and bicarbonate ($HCO_3$) to form a beneficial reuse chemical effluent.

In some embodiments, the invention involves a process for separating solids and oil from water further comprising the step of transferring the beneficial reuse chemical that contains a suppressed pH<0.99 from high concentration of hydrogen ($H^+$) ions and an oxidation reduction potential (ORP) of >+300.00 mV consisting of oxygen ($O^-$) ions, oxidants and carbon arrays and or other chelation chemistries available in an effluent to a beneficial reuse chemical effluent storage tank.

In some embodiments, the invention involves a process for separating solids and oil from water further comprising the step of introducing at least one stream of beneficial reuse chemical effluent that contains a suppressed pH<0.99 from high concentration of hydrogen ($H^+$) ions and an oxidation reduction potential (ORP) of >+300.00 mV consisting of oxygen ($O^-$) ions, oxidants and carbon arrays and or other chelation chemistries available into one or more streams of treated water.

In some embodiments, the invention involves a process for separating solids and oil from water of claim 1 further comprising the step of storing the separated first reuse treatment stream before treating the separated first reuse treatment stream with an oxidizer such as hydrogen peroxide ($H_2O_2$), sodium hypochlorite (NaOCl), sodium chlorite (NaClO$_2$) to prevent the formation of chlorine dioxide ($ClO_2$) halogen compounds allowing for the formation of a salt (NaCl) and freeing the oxidizers oxygen ($O_2$) and electrons ($3^e$) to oxidize iron (Fe) compounds and allow for redox process to occur and an acid that has the hydrogen ($H^+$) ion sequestered with a carbon array or other corrosion inhibitors, such as a 4-(2-Hydroxy-3-Methoxybenzylideneamino) antipyrine (HMBA), 2-Mercaptobenzothiazole (MBT) and or a N-oleyl-1,3-propanediamine based formulation to form a twice treated reuse treatment stream.

In some embodiments, the invention involves a process for separating solids and oil from water comprising the steps of: introducing a beneficial reuse chemical effluent into a stream of water that has been treated with one or more of the following components: acids that has the hydrogen ($H^+$) ion sequestered with a carbon array or other corrosion inhibitors, such as a 4-(2-Hydroxy-3-Methoxybenzylideneamino) antipyrine (HMBA), 2-Mercaptobenzothiazole (MBT) and or a N-oleyl-1,3-propanediamine based formulation, oxidizers such as hydrogen peroxide ($H_2O_2$), sodium hypochlorite (NaOCl), sodium chlorite (NaClO$_2$) to prevent the formation of chlorine dioxide ($ClO_2$) halogen compounds allowing for the formation of a salt (NaCl) and freeing the oxidizers oxygen ($O_2$) and electrons ($3^e$) to oxidize iron (Fe) compounds and allow for redox process to occur, chelators carbon arrays or EDTA (ethylenediaminetetraacetic acid), deferoxamine, deferasirox, and deferiprone, emulsion breakers examples include sodium lauryl ether sulfate (SLES), sodium lauryl sulfate (SLS), benzalkonium chloride (BKC), polyoxyethylene 23 lauryl ether (C12E23), scavengers MEA (monoethanoloamine) and MMA (monomethylamine) triazines, and scale inhibitors phosphonates like ATMP, poly(acrylic) acid (PAA), and polymers with carboxylate or sulfonate functional groups, to form a first reuse treatment stream; directing the first reuse treatment stream to an oil separation process, which outputs at least an oil and gas outlet stream and a separated first reuse treatment stream; treating the separated first reuse stream with a chemical stream comprising one or more of the following components: chelating agents carbon arrays or EDTA (ethylenediaminetetraacetic acid), deferoxamine, deferasirox, and deferiprone, strong acid hydrogen chloride (HCl), acetic acid ($CH_3COOH$), phosphoric acid ($H_3PO_4$) that has a bonded carbon array to prevent the hydrogen from potentiating and forming the hydronium ion ($H_3O$) and there by sequestering the hydrogen until a desire charge reaction with other ions in the water is present such as iron sulfide (FeS), iron carbonate (FeCO$_3$) and calcium carbonate (CaCO$_3$) and bicarbonate (HCO$_3$), and oxidizers such as hydrogen peroxide (H$_2$O$_2$), sodium hypochlorite (NaOCl), sodium chlorite (NaClO$_2$) to prevent the formation of chlorine dioxide (ClO$_2$) halogen compounds allowing for the formation of a salt (NaCl) and freeing the oxidizers oxygen (O$_2$) and electrons (3$^e$) to oxidize iron (Fe) compounds and allow for redox process to occur, to form a twice treated reuse treatment stream; introducing a beneficial reuse chemical effluent into the twice treated reuse treatment stream to form a second reuse treatment stream; passing the second reuse treatment stream through one or more storage tanks to form a pre-filter stream; directing the pre-filter stream through a solids collection device and removing a post-filter stream; directing the post-filter stream into a chemical reactor where it is treated with a stream of acid to form a beneficial reuse chemical effluent.

The present invention may apply to weir pits, wherein fluid is taken from the pit and misted across the pit and/or adjacent tank or gun barrel.

This application has presented several embodiments of the present invention and discussed various devices, such as valves, pumps, cone bottom tanks, lines, etc. It is contemplated that these units and devices may exist in varying arrangements, combinations, and still reflect the spirit of the present invention. The present invention may be incorporated into other assemblies, which may have fewer (or more) water tanks.

In alternative embodiments, the nozzles used to spray fluid over tanks could be adjustable in length and/or flow, which could be controlled manually or through the use of automation (e.g., pistons, air bladders and/or hydraulic pumps).

The present invention is described above in terms of a preferred illustrative embodiment in which a specifically described refining plant and method are described. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

I claim:

1. A process for separating solids and oil from water comprising the steps of:

providing a chemical reactor;

treating a feed stream in the chemical reactor with a stream of a strong acid having carbon nanostructures bonded thereto to form a beneficial reuse chemical effluent, wherein the beneficial reuse chemical effluent comprises hydrogen ions (H+), oxygen (O–) ions, carbon nanostructures selected from the group consisting of activated carbon, carbon nanotubes, and graphene, and chelating agents;

introducing a first portion of the beneficial reuse chemical effluent into a stream of water that has been treated with acid, alcohols, and ethoxylated alcohols to form a first reuse treatment stream;

directing the first reuse treatment stream to an oil separation process, which outputs at least an oil and gas outlet stream and a separated first reuse treatment stream;

treating the separated first reuse stream with an oxidizer and an acid to form a twice-treated reuse treatment stream;

introducing a second portion of the beneficial reuse chemical effluent into the twice-treated reuse treatment stream to form a second reuse treatment stream;

passing the second reuse treatment stream through one or more storage tanks to form a pre-filter stream;

directing the pre-filter stream through a solids collection device selected from the group consisting of filters, screens, and centrifuges and removing a post-filter stream therefrom; and directing the post-filter stream into the chemical reactor, wherein the post-filter stream serves as the feed stream of step treating a feed stream in the chemical reactor with a stream of a strong acid having carbon nanostructures bonded thereto to form a beneficial reuse chemical effluent, thereby continuously producing the beneficial reuse chemical effluent.

2. The process for separating solids and oil from water of claim 1 further comprising the step of transferring a portion of the beneficial reuse chemical effluent to a beneficial reuse chemical effluent storage tank.

3. The process for separating solids and oil from water of claim 1 further comprising the step of introducing at least one stream of the beneficial reuse chemical effluent into one or more streams of treated water selected from the group consisting of the first reuse treatment stream, the twice-treated reuse treatment stream, the second reuse treatment stream, the pre-filter stream, and the post-filter stream.

4. The process for separating solids and oil from water of claim 1 further comprising the step of storing the separated first reuse treatment stream before treating the separated first reuse treatment stream with an oxidizer to form a twice treated reuse treatment stream.

5. The process for separating solids and oil from water of claim 1 wherein a portion of the beneficial reuse chemical effluent is directed to one or more of the following: an oilfield pit, a storage vessel, a fracking system, or disposal.

6. The process for separating solids and oil from water of claim 1 wherein the solids collection device is a clean-in-place filter.

7. The process for separating solids and oil from water of claim 1 wherein the chemical reactor has a cone bottom.

8. The process for separating solids and oil from water of claim 7 wherein the chemical reactor continuously recirculates with an induced vortex in the center of the reaction tank.

9. The process of claim 1, wherein the beneficial reuse chemical effluent does not accumulate contaminants that degrade its oil separation performance during recycling.

10. The process of claim 1, wherein the hydrogen ions sequestered by carbon nanostructures remain available for acid functionality while being protected in a reusable form.

11. The process of claim 1, wherein sequestering the hydrogen ions with carbon nanostructures enables continuous recycling of the beneficial reuse chemical effluent without loss of acid functionality.

12. The process of claim 1, wherein the beneficial reuse chemical effluent has a pH less than 1.0.

13. The process of claim 1, wherein the beneficial reuse chemical effluent has a pH less than 0.10.

14. A process for separating solids and oil from water comprising the steps of:

forming a beneficial reuse chemical effluent in a chemical reactor by treating a feed stream with a stream of acid, wherein the beneficial reuse chemical effluent comprises sequestered hydrogen ions, oxygen ions, carbon nanostructures, and chelating agents;

introducing a first portion of the beneficial reuse chemical effluent into a stream of water that has been treated with one or more of the following components: acids, oxidizers, chelators, emulsion breakers, and scale inhibitors to form a first reuse treatment stream;

directing the first reuse treatment stream to an oil separation process, which outputs at least an oil and gas outlet stream and a separated first reuse treatment stream;

treating the separated first reuse stream with a chemical stream comprising one or more of the following components: chelating agents, strong acids, and oxidizers, to form a twice treated reuse treatment stream;

introducing a second portion of the beneficial reuse chemical effluent into the twice treated reuse treatment stream to form a second reuse treatment stream;

passing the second reuse treatment stream through one or more storage tanks to form a pre-filter stream;

directing the pre-filter stream through a solids collection device and removing a post-filter stream; and directing the post-filter stream into the chemical reactor, wherein the post-filter stream serves as the feed stream of step forming a beneficial reuse chemical effluent in a chemical reactor by treating a feed stream with a stream of acid, thereby continuously producing the beneficial reuse chemical effluent.

15. The process for separating solids and oil from water of claim 14 wherein the acids have hydrogen ($H^+$) ions that are sequestered by carbon nanostructures selected from the group consisting of activated carbon, carbon nanotubes, and graphene.

* * * * *